(12) United States Patent
Le et al.

(10) Patent No.: US 8,495,903 B1
(45) Date of Patent: Jul. 30, 2013

(54) CALIBRATION SYSTEM FOR A DEBURRING TOOL

(75) Inventors: Hieu Trung Le, St. Charles, MO (US); Donald J. Grzina, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 13/226,739

(22) Filed: Sep. 7, 2011

(51) Int. Cl.
*G01D 18/00* (2006.01)

(52) U.S. Cl.
USPC ............................................. 73/1.01

(58) Field of Classification Search
None
See application file for complete search history.

(56) References Cited

U.S. PATENT DOCUMENTS

| | | | | |
|---|---|---|---|---|
| 6,009,623 | A | * | 1/2000 | Orloff ........................... 30/41.7 |
| 2010/0104310 | A1 | * | 4/2010 | Thayer et al. ................... 399/71 |
| 2010/0257986 | A1 | * | 10/2010 | Borg et al. ........................ 83/13 |

OTHER PUBLICATIONS

"Deburring," Deburring Tools, 2009, Catalog No. 100 12-09, Cogsdill Tool Products, Inc., pp. 1-28.
E-Z Burr Products website, retrieved from http://www.ezburr.com/products/index.php on Jul. 11, 2011.

* cited by examiner

*Primary Examiner* — Robert R Raevis
(74) *Attorney, Agent, or Firm* — Yee & Associates

(57) ABSTRACT

A method and apparatus for calibrating a tool. A moveable blade connected to the tool may be deflected towards an inward position with respect to the tool. A force applied to the moveable blade may be detected by a biasing mechanism in the tool using a sensor when the moveable blade is in the inward position with respect to the tool. The biasing mechanism in the tool may be adjusted if the force is not a desired force.

17 Claims, 20 Drawing Sheets

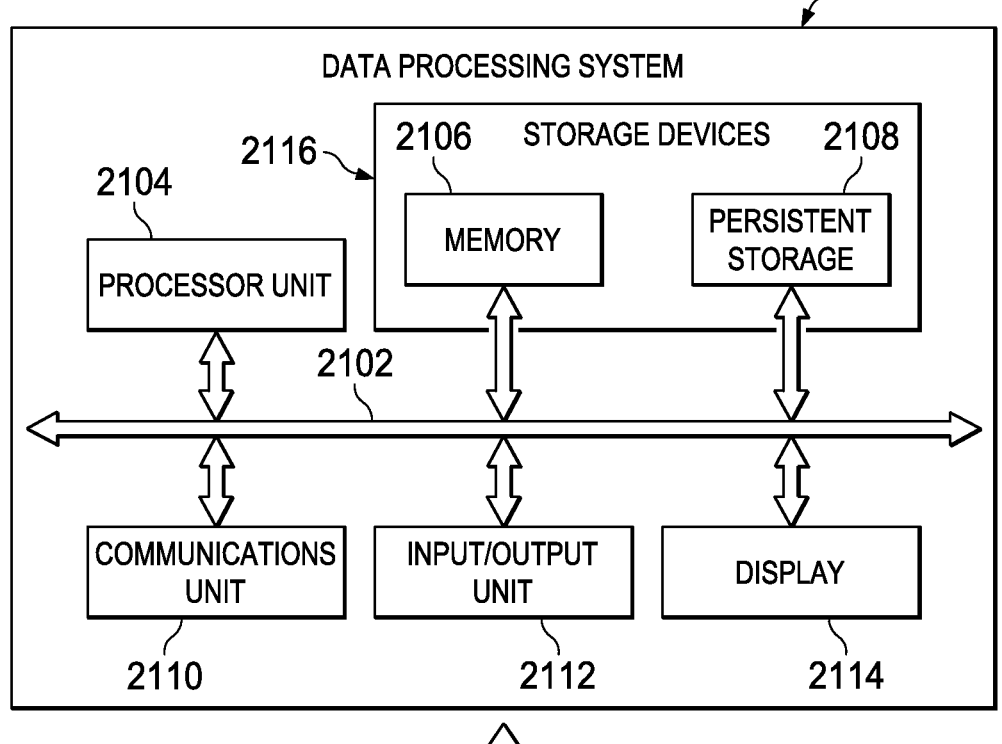
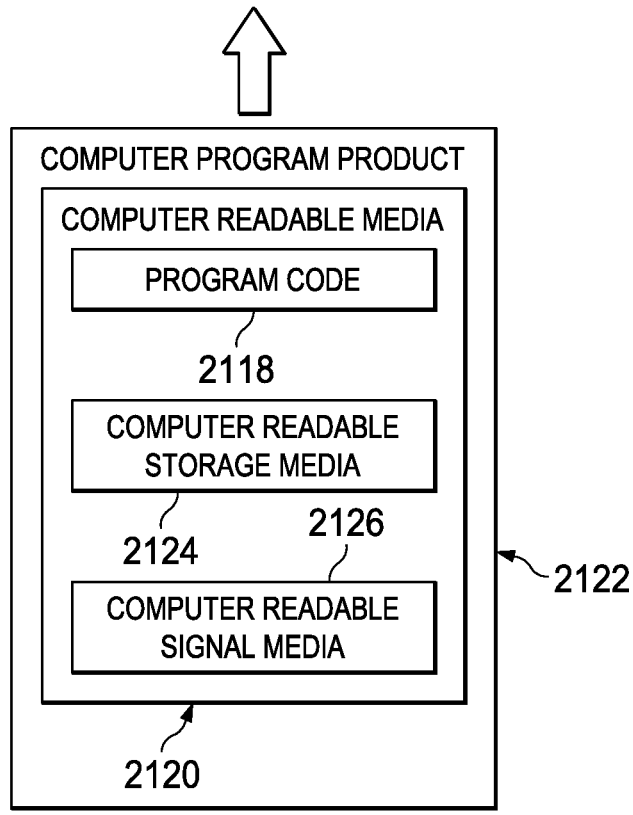
FIG. 21

CALIBRATION SYSTEM FOR A DEBURRING TOOL

BACKGROUND INFORMATION

1. Field

The present disclosure relates generally to manufacturing and, in particular, to manufacturing systems. Still more particularly, the present disclosure relates to a method and apparatus for calibrating tools used in manufacturing.

2. Background

The manufacturing of products, such as aircraft, may be complex. For example, without limitation, thousands of parts may be manufactured and assembled to form an aircraft. The assembly of these parts to form an aircraft may involve positioning parts relative to each other and connecting those parts to each other. For example, without limitation, when parts that are to be connected have been positioned relative to each other, a fastening system may be used to connect these parts to each other. The fastening system may be placed into holes that have been formed at connection points on the parts. A fastening system may include, for example, without limitation, a bolt and a nut, a rivet, and/or other suitable types of fasteners.

Tools, such as drills, may be used to form holes in parts for use with fastening systems. A drill may be a machine that rotates a drill bit. When forming a hole in a part, the drill bit may pass through the front side of the part and exit the back side of the part while being rotated to form the hole. The drill bit may then be moved back through the hole to remove the drill bit from the hole.

This process may result in inconsistencies that may be formed on the front surface or backside surface of the part. These inconsistencies may take the form of burrs. Burrs may be raised edges for holes. Typically, these inconsistencies may be reduced and/or removed using another type of tool, such as a deburring tool. A deburring tool may have a blade that is moveable. Further, the deburring tool may be rotated on a machine in a similar fashion to the rotation of the drill bit on the drilling tool.

When used to reduce and/or remove an inconsistency formed on the front and/or backside surfaces of the part, the deburring tool may be passed through the hole from the front side of the part to the backside of the part while rotating. Rotation of the deburring tool may rotate the blade on the deburring tool. This rotation of the blade on the deburring tool may reduce and/or remove the inconsistency formed on the front and/or backside surfaces of the hole.

In some cases, a chamfer may be formed at the backside of the part when the blade removes the inconsistency. A chamfer may be a beveled edge. The chamfer may be formed in the hole at the edge of the hole on the front and/or backside surfaces of the part. In some cases, the size of the chamfer formed may be undesirable.

Therefore, it would be advantageous to have a method and apparatus that takes into account at least some of the issues discussed above, as well as possibly other issues.

SUMMARY

In one advantageous embodiment, a method for calibrating a tool may be provided. A moveable blade connected to the tool may be deflected towards an inward position with respect to the tool. A force applied to the moveable blade by a biasing mechanism in the tool may be detected using a sensor when the moveable blade is in the inward position with respect to the tool. The biasing mechanism in the tool may be adjusted if the force is not a desired force.

In another advantageous embodiment, a method for calibrating a deburring tool may be provided. The deburring tool with a moveable blade connected to the deburring tool may be placed into an adapter configured to receive the deburring tool. The adapter with the deburring tool may be placed into a housing. A force transfer member within the housing may be positioned relative to the deburring tool and the adapter. A position of the force transfer member may be configured to cause the moveable blade to move towards an inward position. The force transfer member may be configured to transfer a force applied to the moveable blade by a biasing mechanism in the tool to a sensor. The force applied to the moveable blade by the biasing mechanism may be detected using the sensor. The force may be exerted by a spring in the biasing mechanism. The biasing mechanism may be adjusted using an adjustment tool and an adjustment screw in the biasing mechanism to perform at least one of extending and compressing the spring in the biasing mechanism to adjust the force applied to the moveable blade if the force detected by the sensor is not a desired force selected for reducing an inconsistency generated in response to forming a hole.

In yet another advantageous embodiment, an apparatus may comprise a housing and a sensor. The housing may be configured to receive a tool with a moveable blade that can be moved into the tool to an inward position. The sensor may be associated with the housing in which the sensor may be configured to detect a force applied to the moveable blade by a biasing mechanism in the tool when the moveable blade is in the inward position.

In yet another advantageous embodiment, a calibration system may comprise a housing, a sensor, an adjustment tool, an adapter, a force transfer member, a positioning system, and a data processing system. The housing may be configured to receive a deburring tool with a moveable blade that can be moved into the deburring tool to an inward position in which the deburring tool is configured to remove an inconsistency generated in response to forming a hole. The sensor may be associated with the housing. The sensor may be configured to detect a force applied to the moveable blade by a biasing mechanism in the deburring tool when the moveable blade is in the inward position. The biasing mechanism in the deburring tool may be configured to bias the blade away from the inward position to generate the force. The adjustment tool may be configured to change the force applied to the moveable blade by the biasing mechanism. The adapter may be configured to receive the deburring tool. The adapter may further be configured to be placed into a channel in the housing. The force transfer member may be configured to transfer the force applied to the moveable blade by the biasing mechanism to the sensor. The positioning system may be configured to hold the adapter in a desired position for detecting the force applied to the moveable blade by the biasing mechanism. The data processing system may be in communication with the sensor. The data processing system may be configured to determine whether the force detected by the sensor is a desired force.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 21 is an illustration of a data processing system in accordance with an advantageous embodiment.

DETAILED DESCRIPTION

The different advantageous embodiments recognize and take into account different considerations. For example, without limitation, the different advantageous embodiments recognize and take into account that the tools used to reduce and/or remove inconsistencies that are created during the formation of holes may have moveable blades. These moveable blades may be configured to extend out of and retract into the tools as the tools are passed through the holes. In particular, these moveable tools may be biased to be in an extended position when not inside a hole.

For example, without limitation, a deburring tool may be placed into a hole in a part from a front side of the part and pass through the hole such that a moveable blade connected to the deburring tool exits a backside of the part. The deburring tool may be rotated such that the moveable blade also rotates, while the deburring tool is passed through the hole and back out of the hole. Rotation of the moveable blade when the moveable blade is outside of the hole at the backside of the part may reduce and/or remove the inconsistencies formed at the edge of the hole.

The different advantageous embodiments recognize and take into account that when the deburring tool is moved back out of the hole, the rotation of the moveable blade may cause a portion of the part at the edge of the hole to be removed. This portion of the part may form a beveled edge at the edge of the hole. This beveled edge may also be referred to as a chamfer.

The different advantageous embodiments recognize and take into account that when a force biasing the moveable blade into an extended position is greater than desired, the chamfer formed may have dimensions large than desired. Further, the different advantageous embodiments also recognize and take into account that when the force biasing the moveable blade into an extended position is less than desired, the moveable blade may be unable to reduce and/or remove the inconsistencies at the edge of the hole as desired.

The different advantageous embodiments recognize and take into account that it may be desirable to have a method for calibrating the deburring tool such that the force biasing the moveable blade to be in the extended position may be substantially equal to a desired force within selected tolerances. One illustrative example of a deburring tool for which calibration may be desired is described in FIG. 1 below.

Figure 1:
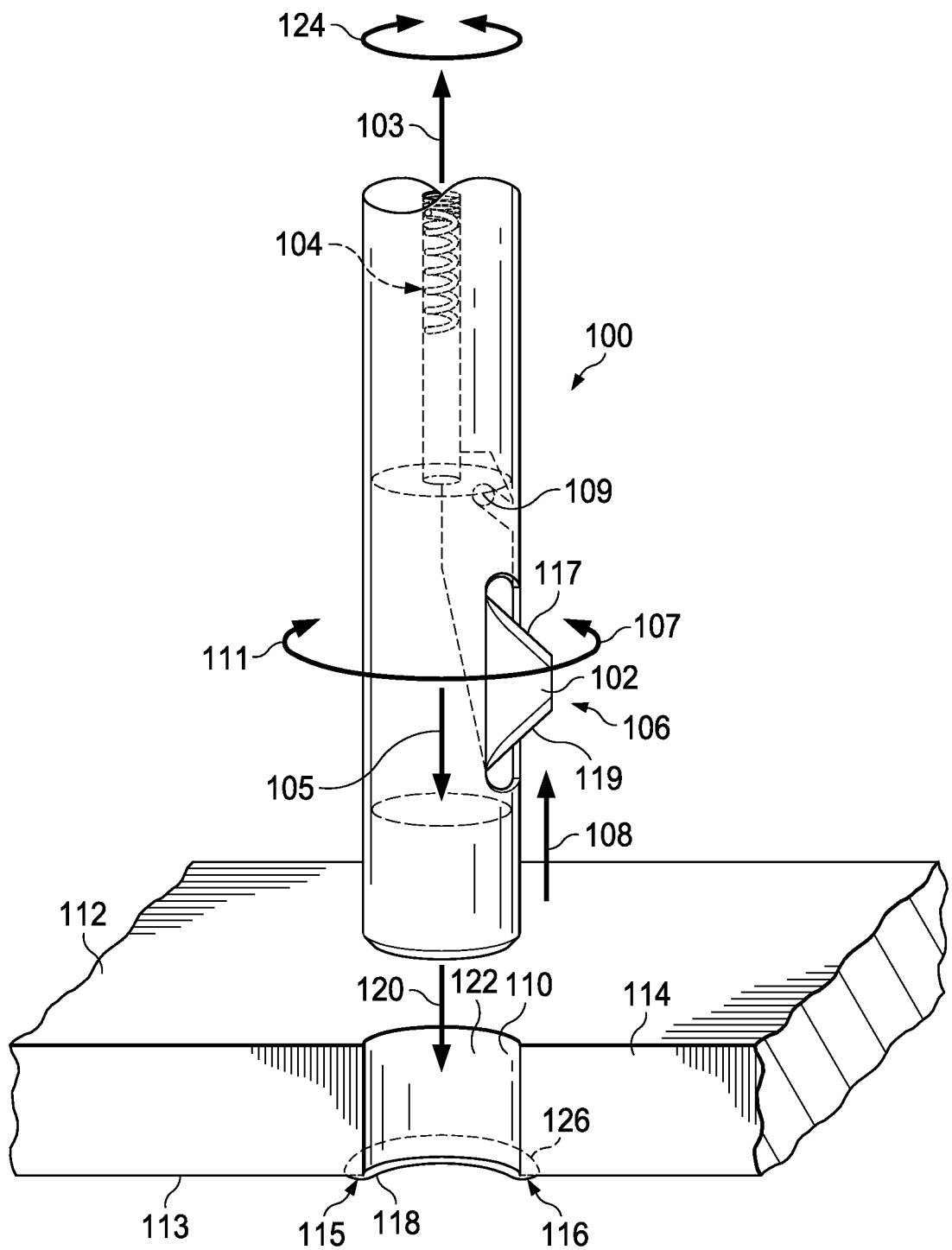
FIG. 1 is an illustration of a deburring tool in accordance with an advantageous embodiment.

With reference now to the figures and, in particular, with reference now to FIG. 1, an illustration of a deburring tool is depicted in accordance with an advantageous embodiment. In this illustrative example, deburring tool 100 may have moveable blade 102. Moveable blade 102 may be configured to move with respect to axis 103 through deburring tool 100. Axis 103 may be a centerline through deburring tool 100. Moveable blade 102 may be configured to move away from and towards axis 103. In other words, moveable blade 102 may extend out of and retract into deburring tool 100.

Biasing mechanism 104, shown in phantom view in this illustrative example, may be located inside deburring tool 100. Biasing mechanism 104 may be configured to apply force 105 to moveable blade 102 such that moveable blade 102 may be extended out of deburring tool 100. As depicted in this example, force 105 may be applied to moveable blade 102 in a direction substantially parallel to axis 103. Force 105 may cause moveable blade 102 to extend out of deburring tool 100.

In particular, in this illustrative example, the application of force 105 to moveable blade 102 along axis 103 may generate moment 107. When moment 107 is generated, moveable blade 102 may rotate about pin 109 away from axis 103. This rotation may extend moveable blade 102 outside of deburring tool 100. The maximum amount of extension for moveable blade 102 outside of deburring tool 100 may be limited by the design of moveable blade 102.

In this depicted example, biasing mechanism 104 may apply force 105 to moveable blade 102 such that moveable blade 102 may be in extended position 106 when force 108 is not being applied to moveable blade 102. Force 108 may be an opposing force to force 105. As depicted, force 108 may be applied to moveable blade 102 in a direction substantially opposite to force 105.

Force 108 being applied to moveable blade 102 may generate moment 111. When moment 111 of force 108 exceeds moment 107 of force 105, moveable blade 102 may rotate about pin 109 in a direction towards axis 103. In other words, when moment 111 of force 108 exceeds moment 107 of force 105, moveable blade 102 may retract into deburring tool 100.

In this illustrative example, a cross-sectional view of hole 110 in part 114 may be depicted. Hole 110 may have been formed from first side 112 of part 114 to second side 113 of part 114 using, for example, without limitation, a drill (not shown). Moveable blade 102 may have cutting edge 117 and cutting edge 119. Cutting edge 117 may be configured to reduce and/or remove any inconsistencies formed at second side 113 of part 114, while cutting edge 119 may be configured to reduce and/or remove any inconsistencies formed at first side 112 of part 114.

In this illustrative example, the formation of hole 110 may have caused inconsistency 115 to be formed at edge 116 of hole 110 on second side 113 of part 114. In this depicted example, inconsistency 115 may take the form of burr 118.

Deburring tool 100 may be used to reduce and/or remove inconsistency 115 at edge 116 of hole 110. For example, without limitation, deburring tool 100 may be placed into hole 110 and passed through hole 110 in the direction of arrow 120. In particular, deburring tool 100 may be placed into hole 110 at first side 112 of part 114 and moved through hole 110 such that deburring tool 100 exits hole 110 at second side 113 of part 114.

When deburring tool 100 is placed into hole 110, force 108 may be applied to moveable blade 102 by surface 122 of hole 110. Force 105 may be increased as deburring tool 100 is moved in the direction of arrow 120. When moment 111 generated by force 108 being applied to moveable blade 102 exceeds moment 107 generated by force 105 being applied to moveable blade 102 by biasing mechanism 104, moveable blade 102 may rotate about pin 109 towards axis 103 such that moveable blade 102 retracts into deburring tool 100 to allow deburring tool 100 to pass through hole 110.

When deburring tool 100 exits hole 110, force 108 applied to moveable blade 102 may be removed, and moveable blade 102 may move to extended position 106. With moveable blade 102 in extended position 106 outside of hole 110 at second side 113 of part 114, deburring tool 100 may be rotated in the direction of arrow 124 while deburring tool 100 is also moved back out of hole 110 in the direction of arrow 120. This rotation of deburring tool 100 also causes moveable blade 102 to rotate in the direction of arrow 124 while deburring tool 100 is moved in the direction of arrow 120. This rotation of moveable blade 102 and movement of deburring tool 100 may cause inconsistency 115 to be reduced and/or removed.

The different advantageous embodiments recognize and take into account that if force 105 being applied to moveable blade 102 by biasing mechanism 104 is less than a desired force, then moveable blade 102 may be unable to reduce and/or remove inconsistency 115 as desired. Further, the different advantageous embodiments recognize and take into account that if force 105 being applied to moveable blade 102 by biasing mechanism 104 is greater than the desired force, then rotation of moveable blade 102 and movement of deburring tool 100 in the direction of arrow 120 may cause chamfer 126, shown in phantom view in this illustrative example, to be formed in hole 110 at edge 116 of hole 110 on second side 113 of part 114. In particular, chamfer 126 may have undesired dimensions.

Thus, the different advantageous embodiments may provide a method and apparatus for calibrating a tool, such as deburring tool 100 in FIG. 1. Calibrating the tool may include setting the force that is applied to a moveable blade on the tool by a biasing mechanism to a desired force. In particular, the different advantageous embodiments may provide a calibration system for calibrating the tool such that any chamfer that is formed by the tool may have dimensions within selected tolerances.

In one advantageous embodiment, a method for calibrating the tool may be provided. A moveable blade connected to the tool may be moved towards an inward position with respect to the tool. A force applied to a sensor in response to movement of the moveable blade connected to the tool towards the inward position may be detected. A biasing mechanism in the tool may be adjusted if the force is not a desired force. In particular, a force applied to the moveable blade by the biasing mechanism in the tool may be adjusted.

Figure 2:
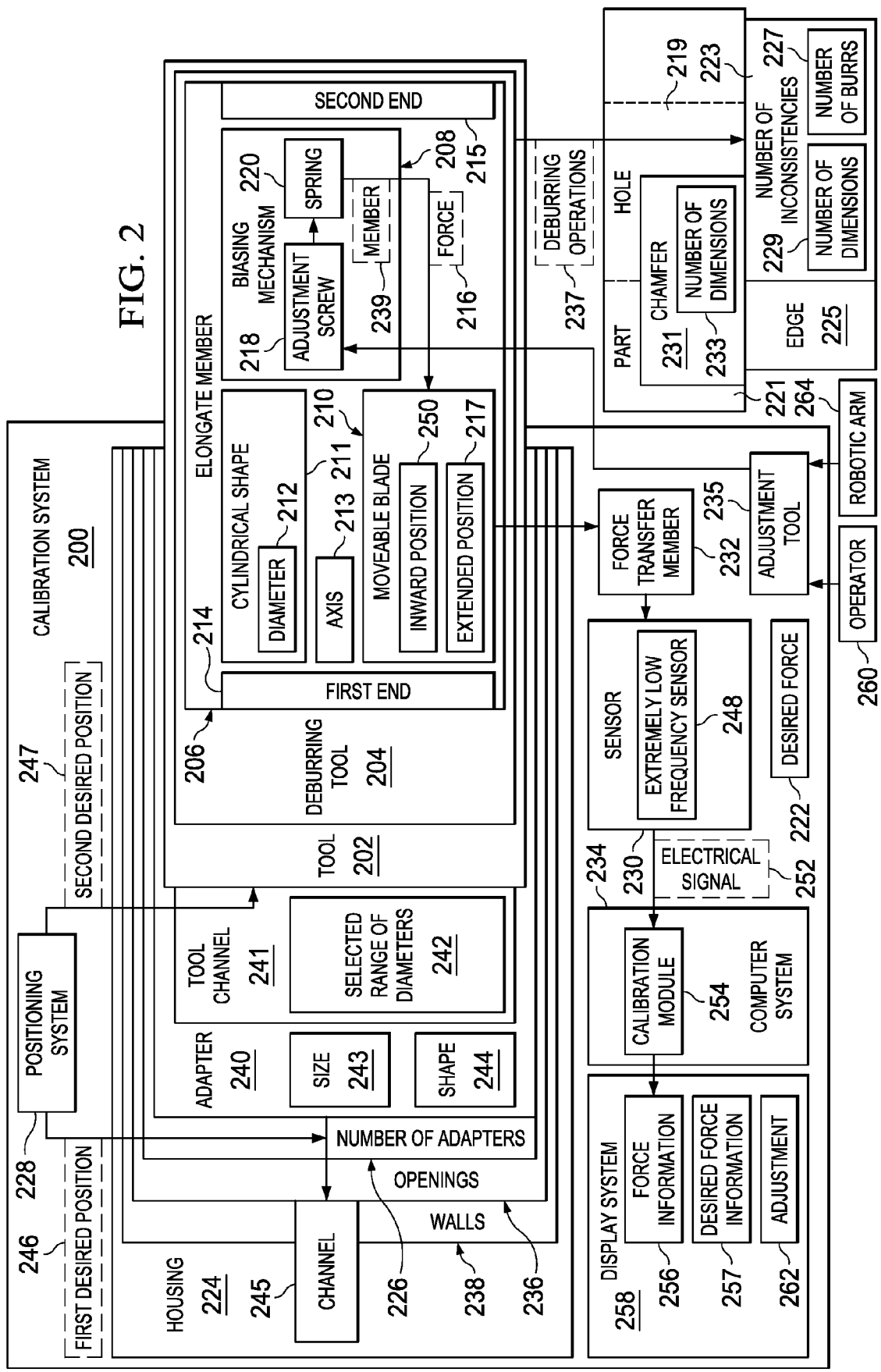
FIG. 2 is an illustration of a block diagram of a calibration system for calibrating a tool in accordance with an advantageous embodiment.

With reference now to FIG. 2, an illustration of a block diagram of a calibration system for calibrating a tool is depicted in accordance with an advantageous embodiment. In these illustrative examples, calibration system 200 may be configured to calibrate tool 202. Tool 202 may take the form of deburring tool 204 in these illustrative examples. Deburring tool 100 in FIG. 1 may be an example of one implementation for deburring tool 204.

As depicted, deburring tool 204 may include elongate member 206, biasing mechanism 208, and moveable blade 210. Elongate member 206 may be a body or tool body for deburring tool 204. In these illustrative examples, elongate member 206 may have cylindrical shape 211 with diameter 212. In other words, elongate member 206 may have a cross-section that has a circular shape with diameter 212.

Of course, in other illustrative examples, elongate member 206 may have some other suitable shape such that the cross-section of elongate member 206 does not have a circular shape. For example, without limitation, the cross-section of elongate member 206 may be a square shape, a rectangular shape, an oval shape, an elliptical shape, a hexagonal shape, a triangular shape, or some other suitable shape.

Additionally, axis 213 through elongate member 206 may be a centerline through cylindrical shape 211 for elongate member 206. Further, elongate member 206 may have first end 214 and second end 215.

Moveable blade 210 may be connected to elongate member 206 at first end 214 of elongate member 206. In particular, moveable blade 210 may be connected to elongate member 206 in a manner that allows moveable blade 210 to extend out of elongate member 206 and retract into elongate member 206. In particular, moveable blade 210 may extend out of elongate member 206 by moving away from axis 213 through elongate member 206. Further, moveable blade 210 may retract into elongate member 206 by moving towards axis 213 through elongate member 206.

In some illustrative examples, moveable blade 210 may be removably connected to elongate member 206. For example, without limitation, moveable blade 210 may be detachable from elongate member 206 such that moveable blade 210 may be replaced with a different moveable blade. In this manner, moveable blades of different sizes and/or shapes may be used with deburring tool 204.

In these illustrative examples, biasing mechanism 208 may be configured to apply force 216 to moveable blade 210 such that moveable blade 210 may extend out of elongate member 206. In particular, biasing mechanism 208 may apply force 216 in a direction towards first end 214 of elongate member 206 that may be substantially parallel to axis 213 of elongate member 206.

Force 216 may be applied to moveable blade 210 such that moveable blade 210 has extended position 217 when no other force other than force 216 is being applied to moveable blade 210. In particular, extended position 217 for moveable blade 210 may be the position furthest away from axis 213 that moveable blade 210 can be moved to when forces other than force 216 are not being applied to moveable blade 210.

Biasing mechanism 208 may be located within elongate member 206. Biasing mechanism 208 may include adjustment screw 218, spring 220, and member 239. Spring 220 may be configured to exert force 216 that is applied to moveable blade 210. In particular, member 239 may transfer force 216 exerted by spring 220 to moveable blade 210. Member 239 may take the form of, for example, without limitation, an elongate member, a rod, a push-rod, a pin, a tube, or some other suitable type of structural member.

Adjustment screw 218 may be used to adjust force 216 exerted by spring 220. For example, without limitation, adjustment screw 218 may be turned to control how much spring 220 is compressed. Force 216 exerted by spring 220 may be adjusted based on this compression of spring 220. In other words, adjustment screw 218 may variably compress spring 220 to adjust force 216.

Deburring tool 204 may be configured to perform deburring operations 237 for hole 219 of part 221. Hole 110 with inconsistency 115 at edge 116 of hole 110 in FIG. 1 may be an example of one implementation for hole 219. Deburring operations 237 may include reducing and/or removing number of inconsistencies 223 at edge 225 of hole 219. Number of inconsistencies 223 may be number of burrs 227 in these illustrative examples.

In these illustrative examples, deburring tool 204 may be placed in hole 219 such that moveable blade 210 is located outside of hole 219 at edge 225 of hole 219. In other words, moveable blade 210 may be positioned relative to number of inconsistencies 223 at edge 225 of hole 219.

Rotation of deburring tool 204 may, in turn, rotate moveable blade 210 connected to elongate member 206 of deburring tool 204. Deburring tool 204 may be rotated while deburring tool 204 is being moved back out of hole 219. Rotation of moveable blade 210 when moveable blade 210 is positioned relative to number of inconsistencies 223 at edge 225 of hole 219 and movement of deburring tool 204 back out of hole 219 may cause number of inconsistencies 223 to be reduced and/or removed from edge 225 of hole 219.

In these illustrative examples, calibrating deburring tool 204 using calibration system 200 may include setting force 216 applied to moveable blade 210 by biasing mechanism 208 to desired force 222. Desired force 222 may be selected such that number of dimensions 229 for number of inconsistencies 223 after deburring operations 237 have been performed may be within selected tolerances. Further, desired force 222 also may be selected such that any chamfer 231 created in response to performing deburring operations 237 may have number of dimensions 233 within selected tolerances.

As depicted, calibration system 200 may include housing 224, number of adapters 226, positioning system 228, sensor 230, force transfer member 232, computer system 234, and adjustment tool 235. As used herein, a number of items may mean one or more items. For example, number of adapters 226 may be one or more adapters.

Housing 224 may be configured to hold, cover, protect, and/or support at least a portion of each of number of adapters 226, positioning system 228, sensor 230, and/or force transfer member 232. In these illustrative examples, housing 224 may take the form of a solid structure, a non-solid structure, a frame, a box, and/or some other suitable type of structure configured to hold, cover, protect, and/or support one or more of the various components in calibration system 200.

In one illustrative example, housing 224 may take the form of a solid structure having openings 236 configured to receive at least a portion of each of number of adapters 226, positioning system 228, sensor 230, and/or force transfer member 232. For example, without limitation, housing 224 may be a cube-shaped solid structure having walls 238 and openings 236 in walls 238. In another illustrative example, housing 224 may be a frame that defines openings 236 through which number of adapters 226, positioning system 228, sensor 230, and force transfer member 232 may be received.

In these illustrative examples, number of adapters 226 may be used to allow tools of different sizes to be inserted into housing 224. Each of number of adapters 226 may be configured to receive a tool, such as tool 202. Adapter 240 may be an example of one of number of adapters 226.

Adapter 240 may have tool channel 241 inside adapter 240. Tool channel 241 may be configured to receive a tool having selected range of diameters 242. Selected range of diameters 242 may be a single diameter in some illustrative examples. Tool channel 241 may be configured to receive any tool having a diameter within selected range of diameters 242. In these illustrative examples, diameter 212 for deburring tool 204 may be within selected range of diameters 242. As a result, adapter 240 may be configured to receive deburring tool 204 within tool channel 241.

Further, adapter 240 may be configured to have size 243 and/or shape 244 that allow adapter 240 to be inserted into channel 245 in housing 224 through one of openings 236 in housing 224. Adapter 240 may be configured to be placed into channel 245 in housing 224. At least a portion of deburring tool 204 may be inserted into tool channel 241 before or after adapter 240 is placed into channel 245 in housing 224. In these depicted examples, adapter 240 and channel 245 may each have a cross-section with a shape selected from one of a circular shape, a square shape, a rectangular shape, an oval shape, an elliptical shape, a hexagonal shape, a triangular shape, and/or some other suitable shape.

In these illustrative examples, positioning system 228 may be used to hold adapter 240 in first desired position 246 in channel 245 in housing 224. Additionally, when deburring tool 204 is placed into tool channel 241, positioning system 228 may be used to hold deburring tool 204 in second desired position 247 in tool channel 241 of adapter 240. Positioning system 228 may include a number of screws, bolts, nuts, pins, members, plates, and/or other suitable components for holding adapter 240 in first desired position 246 and/or deburring tool 204 in second desired position 247.

Positioning system 228 may hold adapter 240 in first desired position 246 in a manner that reduces movement of adapter 240 within channel 245 in housing 224 to within selected tolerances. In particular, in these depicted examples, positioning system 228 may hold adapter 240 in first desired position 246 such that movement of adapter 240 within channel 245 may be substantially prevented.

Additionally, positioning system 228 may be configured to hold deburring tool 204 in second desired position 247 within tool channel 241 in a manner that reduces movement of deburring tool 204 within tool channel 241. In particular, deburring tool 204 may be held in tool channel 241 such that movement of deburring tool 204, such as rotation, may be substantially prevented.

First desired position 246 for adapter 240 and second desired position 247 for deburring tool 204 may be selected such that force 216 applied to moveable blade 210 by biasing mechanism 208 may be detected by sensor 230. Sensor 230 may be configured to measure force 216 in units of, for example, without limitation, pounds-force, Newtons, and/or some other suitable measurement for force 216. Sensor 230 may take the form of a force sensor, also referred to as a load sensor. In particular, sensor 230 may take the form of a transducer. In one illustrative example, sensor 230 may take the form of extremely low frequency (ELF) sensor 248.

In these illustrative examples, force transfer member 232 may be configured to transfer force 216 applied to moveable blade 210 to sensor 230. In other words, force transfer member 232 may function as an interface between moveable blade 210 and sensor 230. In these depicted examples, force transfer member 232 may be inserted into one of openings 236 in housing 224. Positioning system 228 may be used to position force transfer member 232 within housing 224.

In particular, force transfer member 232 may be positioned in housing 224 such that moveable blade 210 may have inward position 250 with respect to deburring tool 204 when deburring tool 204 is in second desired position 247. In particular, inward position 250 may be a position with respect to elongate member 206 of deburring tool 204.

Inward position 250 may be a partially-retracted position for moveable blade 210 or a fully-retracted position for moveable blade 210, depending on the implementation. In other words, inward position 250 may be any position for moveable blade 210 that is closer to axis 213 than extended position 217 when moveable blade 210 is connected to elongate member 206.

In these illustrative examples, inward position 250 may be selected as the position when moveable blade 210 is deflected inwards towards axis 213 about halfway between axis 213 and extended position 217. In other words, inward position 250 may be the position of moveable blade 210 at about 50 percent retraction or about 50 percent extension.

When moveable blade 210 has inward position 250 with respect to elongate member 206, force 216 applied to moveable blade 210 by biasing mechanism 208 may be transferred to force transfer member 232. This transfer of force 216 may cause force transfer member 232 to exert force 216 on sensor 230. In this manner, sensor 230 may detect force 216 as the force being applied to sensor 230 by force transfer member 232.

In response to detecting force 216, sensor 230 may generate electrical signal 252 and send electrical signal 252 to computer system 234 for processing. Computer system 234 may be in communication with sensor 230. In these depicted examples, computer system 234 may take the form of a number of computers, depending on the implementation. When more than one computer is present in computer system 234, these computers may be in communication with each other.

In these illustrative examples, calibration module 254 may be implemented in computer system 234. Calibration module 254 may be implemented using hardware, software, or a combination of both. Calibration module 254 may process electrical signal 252 to identify force information 256. Force information 256 may include, for example, without limitation, a magnitude for force 216 detected by sensor 230.

In some illustrative examples, force information 256 may be included in electrical signal 252 received from sensor 230. In other illustrative examples, calibration module 254 may identify force information 256 from the information contained in electrical signal 252.

In these illustrative examples, calibration module 254 may be configured to display force information 256 on display system 258. Display system 258 may comprise a number of display devices. In some illustrative examples, calibration module 254 also may be configured to display desired force information 257 on display system 258. Desired force information 257 may include a magnitude for desired force 222, selected tolerances for desired force 222, and/or other suitable information about desired force 222.

Operator 260 may view force information 256 on display system 258 and determine whether force 216 being applied to moveable blade 210 by biasing mechanism 208 is desired force 222. In these illustrative examples, operator 260 may determine whether force 216 is substantially equal to desired force 222 within selected tolerances.

If force 216 is not substantially equal to desired force 222 within selected tolerances, operator 260 may use adjustment tool 235 to manipulate adjustment screw 218 in biasing mechanism 208 to adjust force 216 exerted by spring 220. For example, without limitation, adjustment tool 235 may take the form of an Allen wrench. An Allen wrench may also be referred to as an Allen key or hex key. The Allen wrench may be used to turn adjustment screw 218 in biasing mechanism 208 to cause spring 220 to variably compress such that force 216 exerted by spring 220 is adjusted.

In these illustrative examples, operator 260 may use adjustment tool 235 to manipulate adjustment screw 218 until force information 256 displayed on display system 258 indicates that force 216 exerted by spring 220 is substantially equal to desired force 222 within selected tolerances. In some illustrative examples, calibration module 254 may identify and display adjustment 262 for deburring tool 204. Adjustment 262 may be, for example, without limitation, an identification of how many turns of adjustment screw 218 are needed to reach desired force 222.

Of course, in other illustrative examples, calibration module 254 may be configured to determine whether force 216 is desired force 222. For example, without limitation, calibration module 254 may display force information 256 in a manner that indicates when desired force 222 has been reached and when desired force 222 has not been reached.

In one illustrative example, calibration module 254 may display force information 256 in a first color when force 216 is less than desired force 222, a second color when force 216 is greater than desired force 222, and a third color when force 216 is substantially equal to desired force 222 within selected tolerances. In another illustrative example, calibration module 254 may generate a number of visual and/or audible alerts that indicate when force 216 is less than desired force 222, when force 216 is greater than desired force 222, and/or when force 216 is substantially equal to desired force 222 within selected tolerances.

In some illustrative examples, calibration module 254 may be configured to record force information 256 for moveable blade 210 for future use. For example, without limitation, force information 256 generated before operating deburring tool 204 may be compared to force information 256 generated after operating deburring tool 204 or after some selected period of time to verify that force information 256 is substantially the same.

In this manner, the different advantageous embodiments provide a system for calibrating deburring tool 204 such that force 216 being applied to moveable blade 210 by biasing mechanism 208 is substantially equal to desired force 222 within selected tolerances. Calibration system 200 allows different types of deburring tools having moveable blades, such as moveable blade 210, to be calibrated. Further, with calibration system 200, deburring tool 204 may be calibrated for different moveable blades.

The illustration of calibration system 200 and tool 202 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, adjustment screw 218 may be manipulated using robotic arm 264 to adjust force 216 being exerted by spring 220. Robotic arm 264 may allow finer control of adjustment screw 218 as compared to the hands of operator 260. In other illustrative examples, some other type of machine or device may be used to manipulate adjustment screw 218 other than robotic arm 264.

In still other illustrative examples, biasing mechanism 208 may include some other device configured to adjust force 216 exerted by spring 220 other than adjustment screw 218. For example, without limitation, in some illustrative examples, biasing mechanism 208 may include other components in addition to and/or in place of adjustment screw 218. For example, without limitation, biasing mechanism 208 may include an additional number of screws, pins, and/or other suitable types of components.

With reference now to FIGS. 3-10, illustrations of a setup for a calibration system for calibrating a deburring tool are depicted in accordance with an advantageous embodiment. In FIGS. 3-10, the different components that may be used to set up calibration system 300 are depicted.

Calibration system 300 may be an example of one implementation for calibration system 200 in FIG. 2. Calibration system 300 may be used to calibrate a deburring tool, such as deburring tool 204 in FIG. 2 and/or deburring tool 100 in FIG. 1. In FIGS. 3-10, the different components for calibration system 300 may be depicted in phantom view. Calibration system 300 in FIGS. 3-10 may be depicted without a computer system, such as computer system 234 in FIG. 2.

Figure 3:
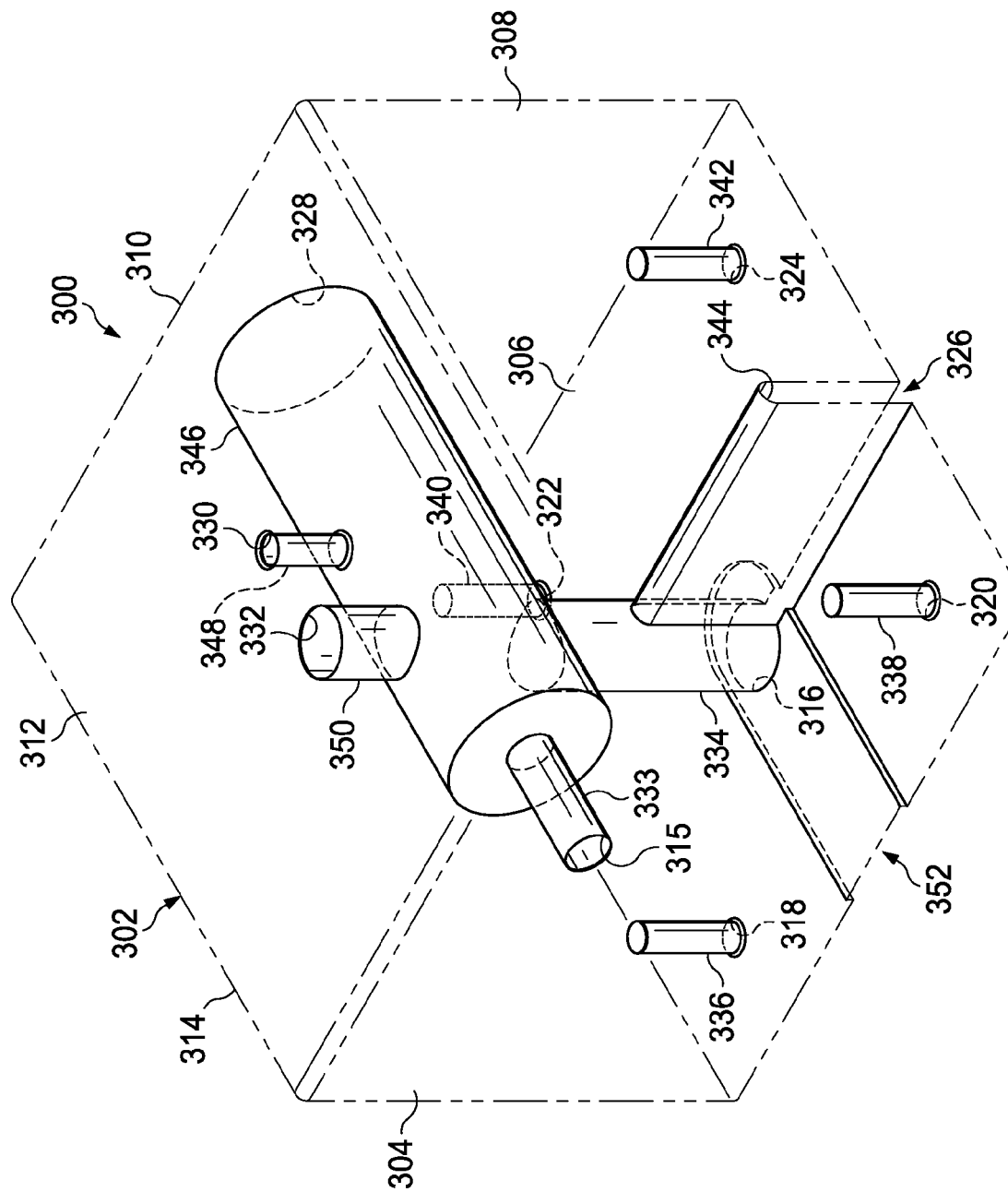
FIG. 3 is an illustration of a phantom perspective view of a housing for a calibration system in accordance with an advantageous embodiment.

Turning now to FIG. 3, an illustration of a phantom perspective view of housing 302 for calibration system 300 may be depicted in accordance with an advantageous embodiment. Housing 302 may be depicted in phantom view in FIGS. 3-10.

In this illustrative example, housing 302 may take the form of a solid structure having walls 304, 306, 308, 310, 312, and 314. Further, housing 302 may have opening 315 in wall 304; openings 316, 318, 320, 322, and 324 in wall 306; opening 326 in wall 308; opening 328 in wall 310; and opening 330 and opening 332 in wall 312.

Openings 315, 316, 318, 320, 322, 324, 326, 328, 330 and 332 in housing 302 may open into channels 333, 334, 336, 338, 340, 342, 344, 346, 348, and 350, respectively, in housing 302. In other words, the openings in housing 302 may provide access to these channels. The various components for calibration system 300 may be inserted into these channels to form calibration system 300.

Further, as depicted, opening 352 also may be formed in the base plate of housing 302. Opening 352 may be shaped to receive a sensor, such as sensor 230 in FIG. 2. In particular, opening 352 may be shaped to receive a sensor, such as extremely low frequency sensor 248 in FIG. 2.

Figure 4:
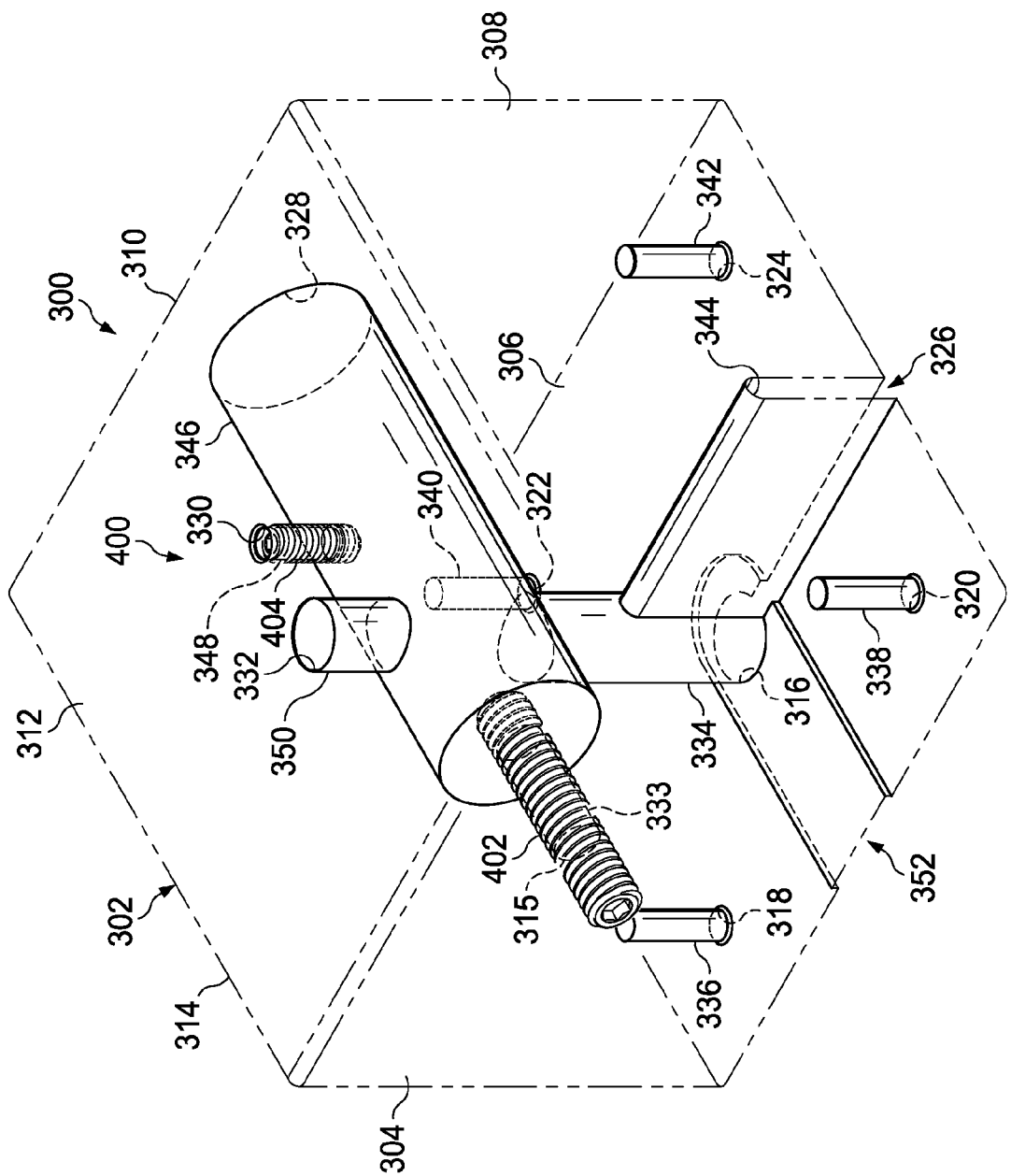
FIG. 4 is an illustration of a perspective view of components for a positioning system that have been inserted into a housing in accordance with an advantageous embodiment.

With reference now to FIG. 4, an illustration of a perspective view of components for a positioning system inserted into housing 302 is depicted in accordance with an advantageous embodiment. In this illustrative example, positioning system 400 may include screw 402 and screw 404. Screw 402 may be inserted into channel 333 in housing 302 through opening 315 in wall 304. Further, screw 404 may be inserted into channel 348 in housing 302 through opening 330 in wall 312.

Figure 5:
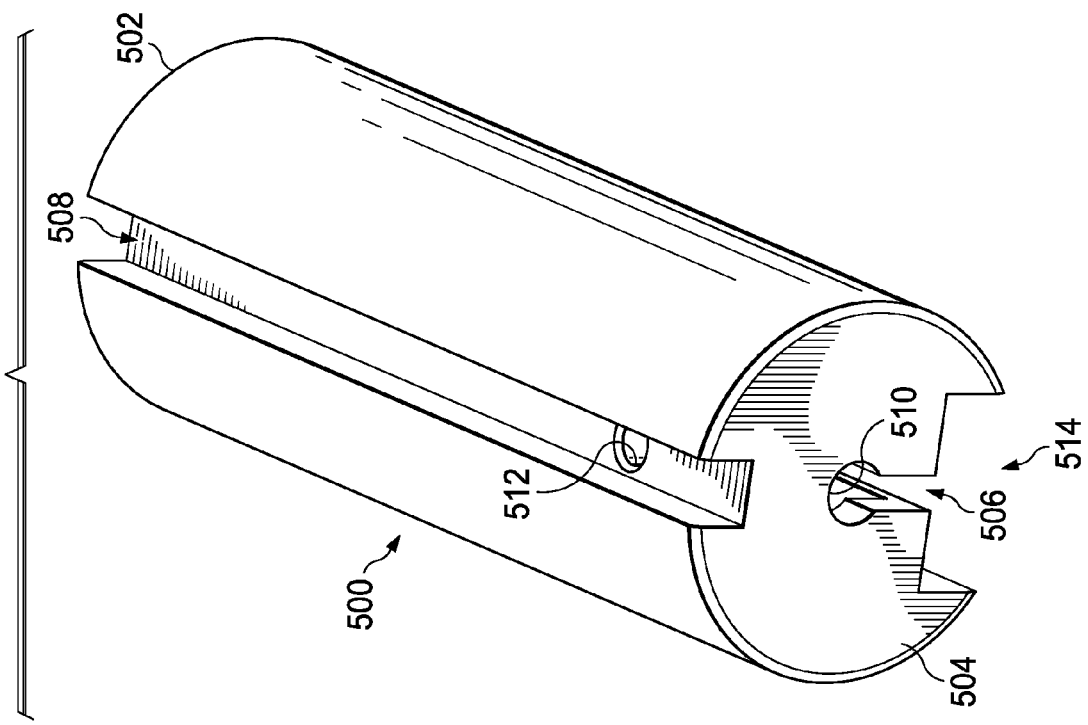
FIG. 5 is an illustration of a top perspective view of an adapter for a calibration system in accordance with an advantageous embodiment.

With reference now to FIG. 5, an illustration of a top perspective view of an adapter for calibration system 300 is depicted in accordance with an advantageous embodiment. In this illustrative example, adapter 500 may be an example of one implementation for adapter 240 in FIG. 2. As depicted, adapter 500 may have first end 502 and second end 504. Further, adapter 500 may have tool channel 506 and groove 508. Tool channel 506 may be configured to receive a tool, such as deburring tool 204 in FIG. 2.

Further, tool channel 506 may have opening 510 along tool channel 506. When a tool having a moveable blade, such as deburring tool 204 having moveable blade 210 in FIG. 2, is placed into tool channel 506, the moveable blade may extend out of tool channel 506 and into opening 510 and open portion 514 of adapter 500.

In this illustrative example, groove 508 may have opening 512 in groove 508. Opening 512 may be configured to receive a component in a positioning system, such as positioning system 228 in FIG. 2. For example, without limitation, opening 512 may be configured to receive a screw.

In this illustrative example, open portion 514 of adapter 500 may be configured to receive a structure, such as, for example, without limitation, force transfer member 232 in FIG. 2. In this manner, the force transfer member may be allowed to come into contact with a moveable blade for a deburring tool extending out of tool channel 506 and into opening 510 when the deburring tool has been inserted into adapter 500.

Figure 6:
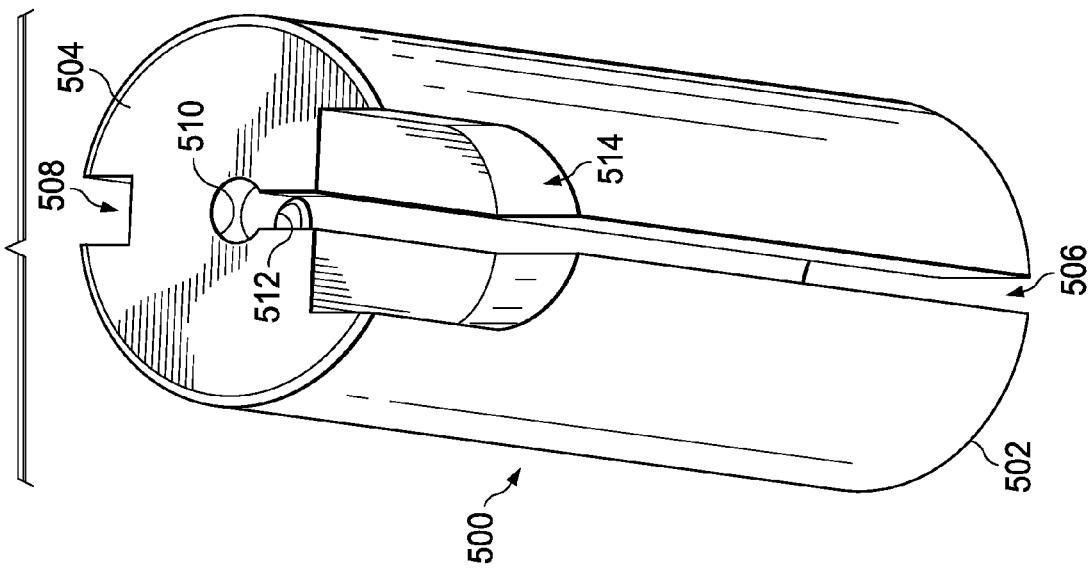
FIG. 6 is an illustration of a bottom perspective view for an adapter in accordance with an advantageous embodiment.

With reference now to FIG. 6, an illustration of a bottom perspective view for adapter 500 is depicted in accordance with an advantageous embodiment. As depicted, opening 510 and open portion 514 may be more clearly seen from this view.

Figure 7:
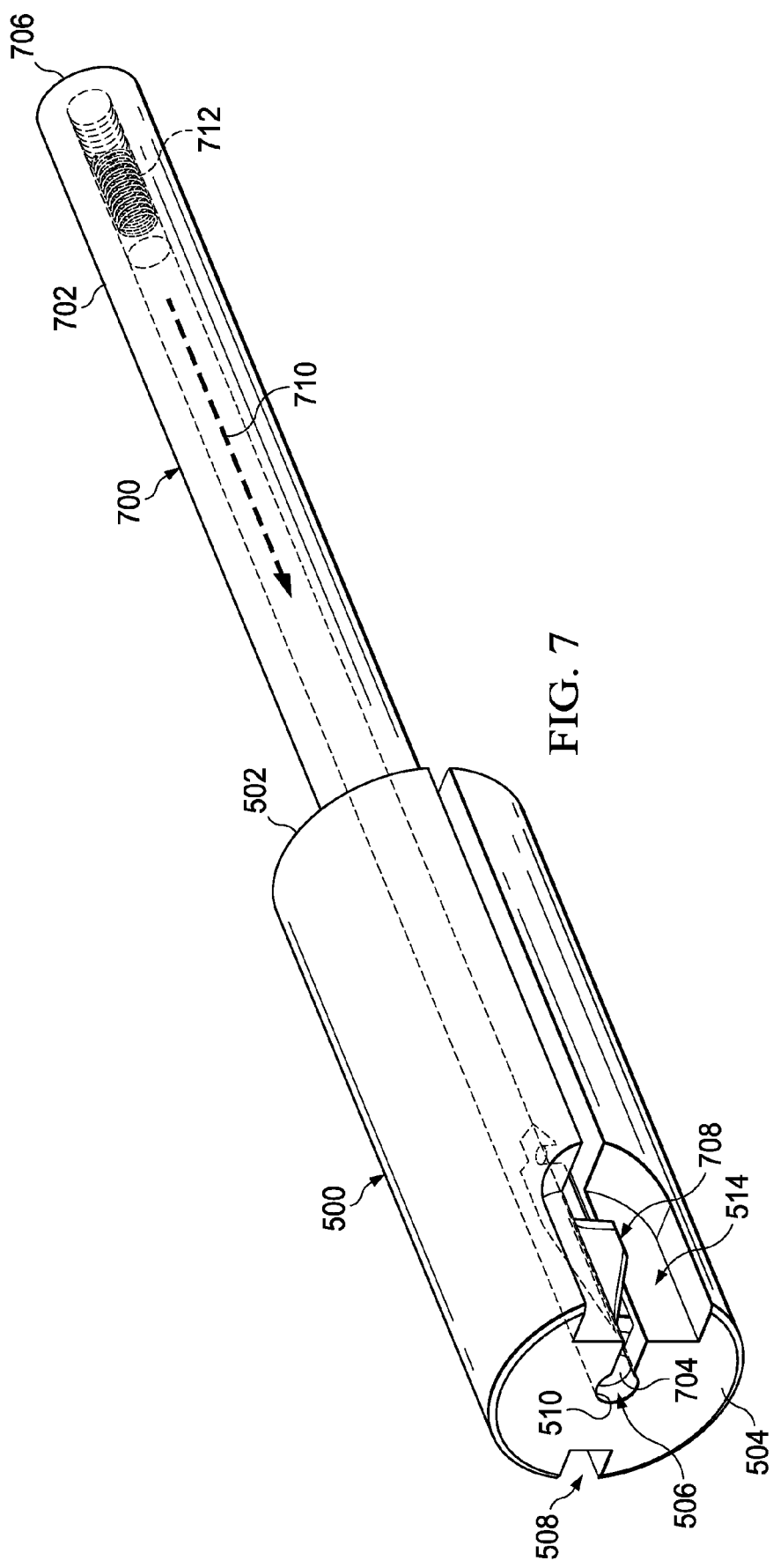
FIG. 7 is an illustration of a deburring tool that has been inserted into an adapter in accordance with an advantageous embodiment.

Turning now to FIG. 7, an illustration of a deburring tool that has been inserted into adapter 500 is depicted in accordance with an advantageous embodiment. In this illustrative example, deburring tool 700 may be an example of one implementation for deburring tool 204 in FIG. 2. As depicted, tool channel 506 and opening 510 may be configured to receive deburring tool 700 and moveable blade 708, respectively.

Deburring tool 700 may include elongate member 702 having first end 704 and second end 706. Further, deburring tool 700 may have moveable blade 708 located at first end 704 of elongate member 702. In this illustrative example, first end 704 of deburring tool 700 may be inserted into first end 502 of adapter 500 and moved along tool channel 506 in adapter 500 in the direction of arrow 710. As depicted, moveable blade 708 may extend out of tool channel 506 and into opening 510 and open portion 514 of adapter 500.

Biasing mechanism 712 may be configured to bias moveable blade 708 away from elongate member 702. In particular, biasing mechanism 712 may be configured to apply a force to moveable blade 708.

Figure 8:
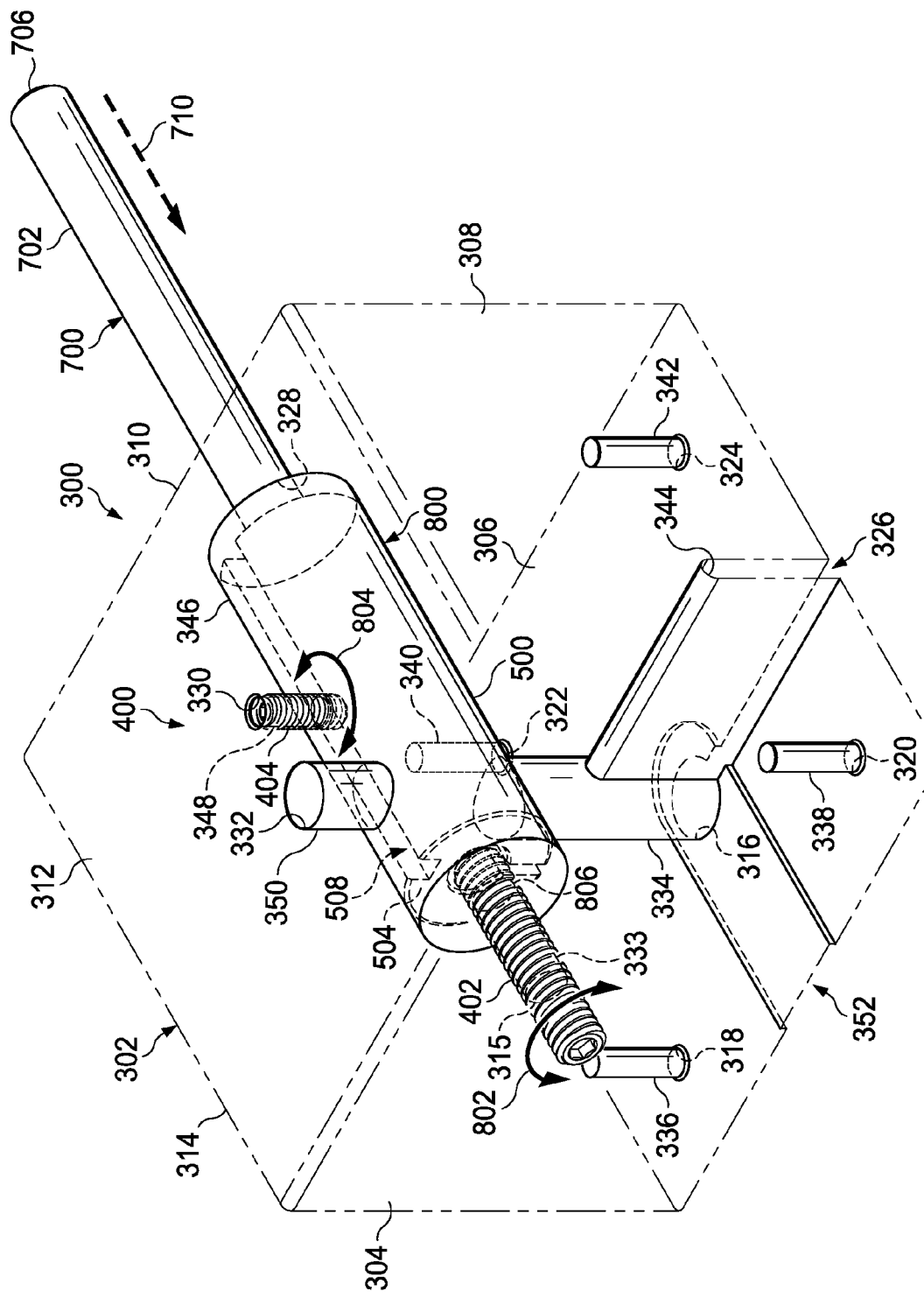
FIG. 8 is an illustration of an adapter with a deburring tool inside a housing in accordance with an advantageous embodiment.

Turning now to FIG. 8, an illustration of adapter 500 with deburring tool 700 inside housing 302 is depicted in accordance with an advantageous embodiment. In this illustrative example, adapter 500 with deburring tool 700 may be inserted into channel 346 in housing 302 through opening 328 in wall 310 of housing 302. In particular, adapter 500 with deburring tool 700 may be inserted into channel 346 of housing 302 in the direction of arrow 710.

When adapter 500 is placed into channel 346 in housing 302, a portion of screw 404 in channel 348 may be guided along groove 508 of adapter 500. As a result, screw 404 may prevent adapter 500 from rotating and/or sliding within channel 346. Further, second end 504 of adapter 500 may contact screw 402 when adapter 500 is inserted into channel 346. Screw 402 may prevent adapter 500 from moving in the direction of arrow 710 within channel 346 past screw 402.

In this manner, screw 402 and screw 404 may be configured to hold adapter 500 in desired position 800 within housing 302. Further, screw 402 may be turned in the direction of arrow 802, and/or screw 404 may be turned in the direction of arrow 804 to adjust desired position 800 for adapter 500.

Desired position 800 for adapter 500 within housing 302 may be selected such that moveable blade 708 in FIG. 7 for deburring tool 700 may be located over channel 334 and opening 316. In particular, desired position 800 may be selected such that a peak or tip of moveable blade 708 is located over channel 334 and opening 316.

Figure 9:
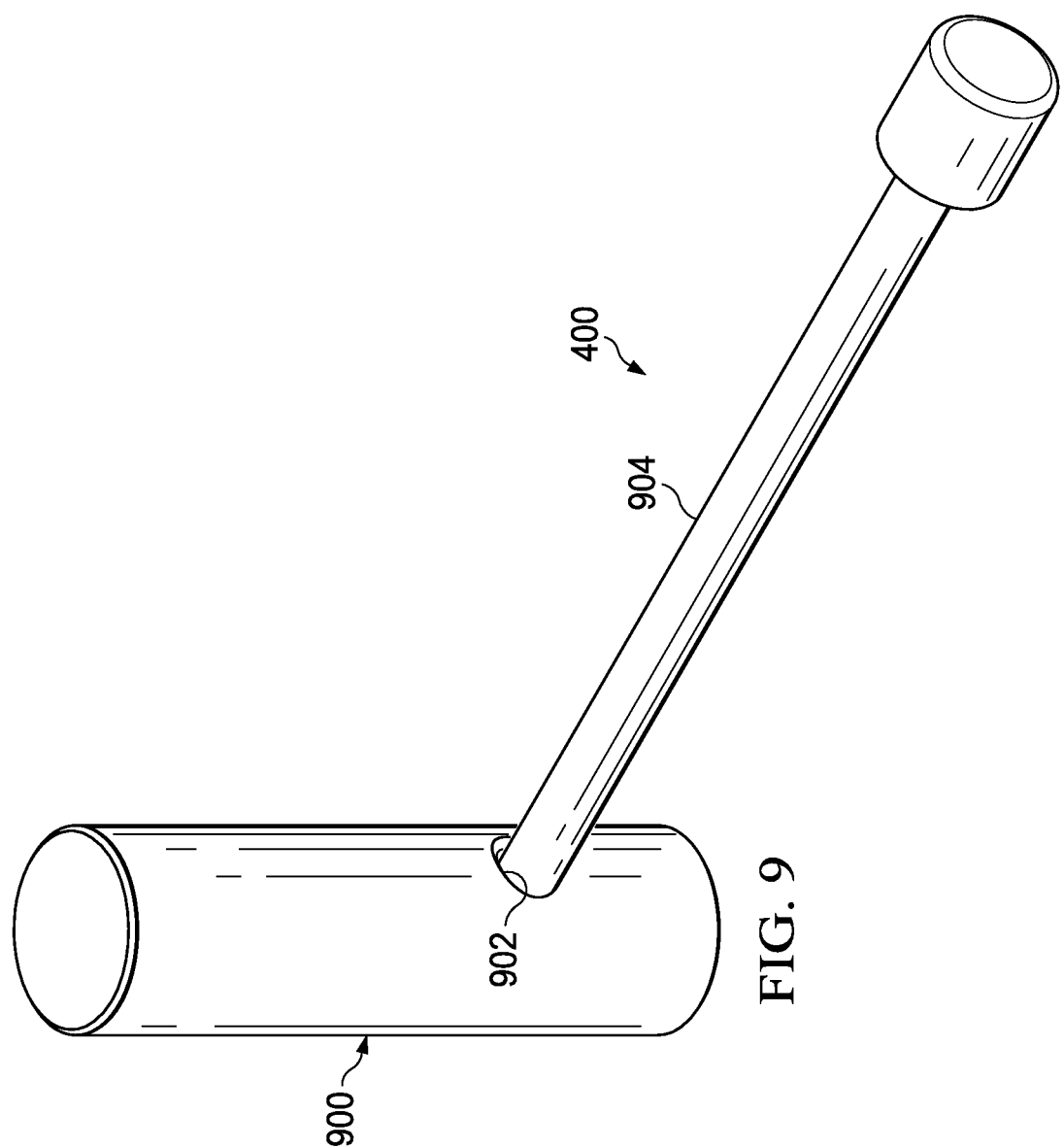
FIG. 9 is an illustration of a force transfer member for a calibration system in accordance with an advantageous embodiment.

With reference now to FIG. 9, an illustration of a force transfer member for calibration system 300 in FIG. 3 may be depicted in accordance with an advantageous embodiment. In this illustrative example, force transfer member 900 may be an example of one implementation for force transfer member 232 in FIG. 2. As depicted, force transfer member 900 may have opening 902 configured to receive bolt 904. In this illustrative example, bolt 904 may be part of positioning system 400.

Figure 10:
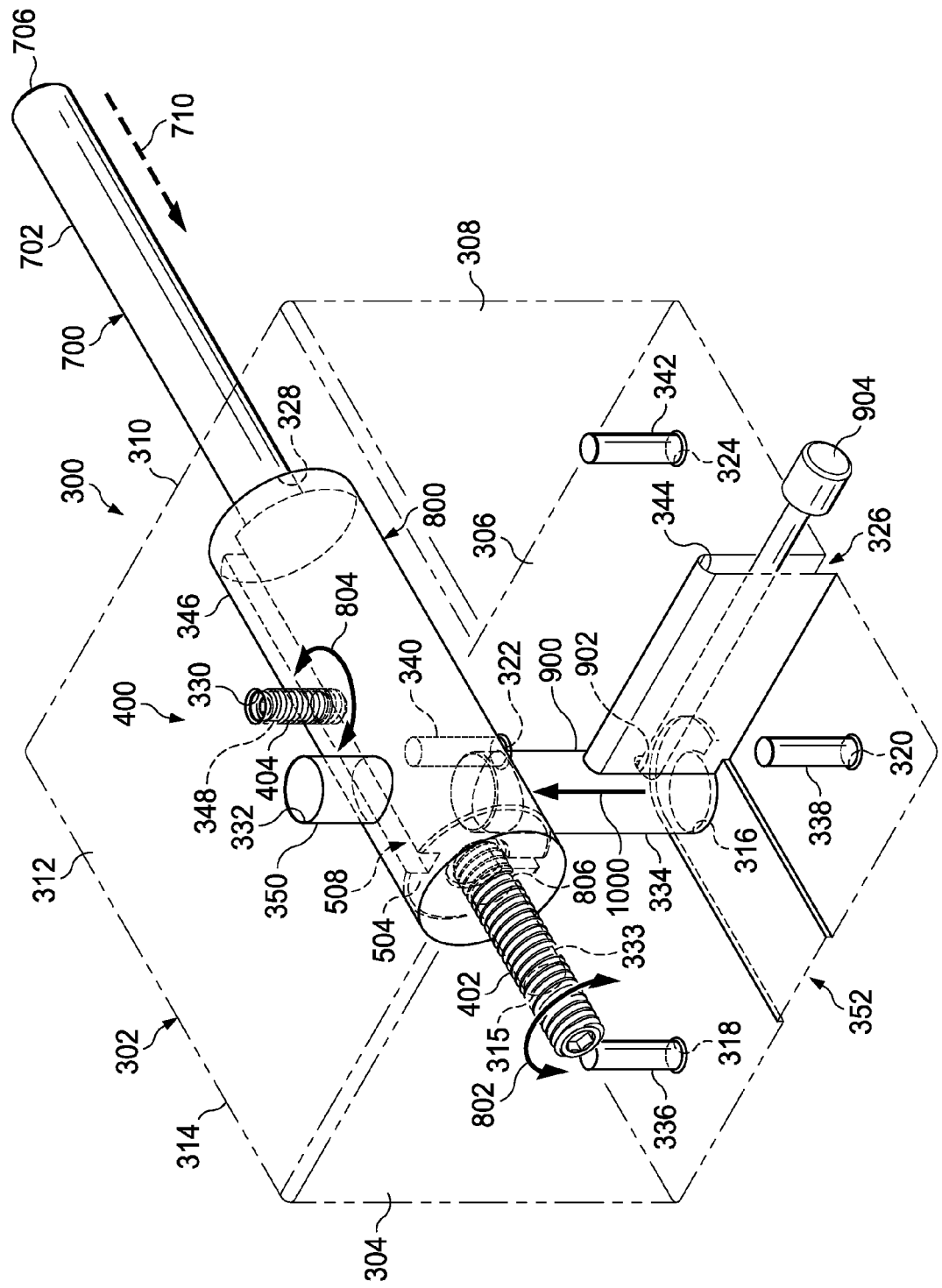
FIG. 10 is an illustration of a force transfer member with a bolt inserted into a housing in accordance with an advantageous embodiment.

With reference now to FIG. 10, an illustration of force transfer member 900 with bolt 904 inserted into housing 302 is depicted in accordance with an advantageous embodiment. In this illustrative example, force transfer member 900 with bolt 904 may be inserted into housing 302. In particular, force transfer member 900 may be received in housing 302 through channel 334, and bolt 904 may be received in housing 302 through channel 344.

As depicted, channel 334 and channel 344 may be connected. In other words, opening 316 and opening 326 may be connected. In this manner, force transfer member 900 and bolt 904 may be placed into channel 334 and channel 344, respectively, of housing 302 through opening 316 and opening 326, respectively, while force transfer member 900 and bolt 904 are connected.

With force transfer member 900 inserted into housing 302, moveable blade 708 in FIG. 7 on deburring tool 700 may be deflected towards an inward position in the direction of arrow 1000. In particular, force transfer member 900 may be positioned within channel 334 in housing 302 such that this deflection may be a retraction of about 50 percent of the total extension for the moveable blade.

Figure 11:
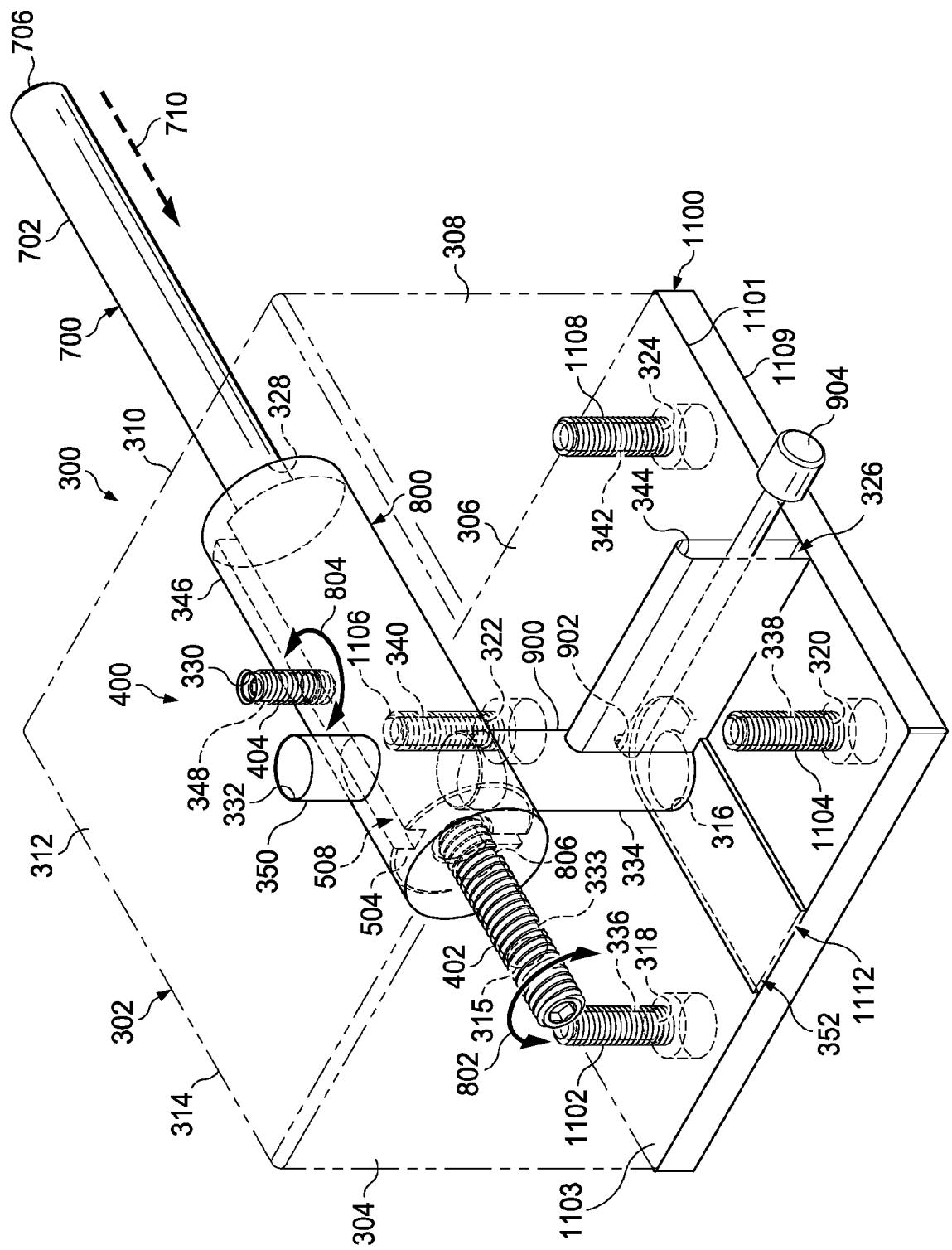
FIG. 11 is an illustration of a base plate attached to a housing in accordance with an advantageous embodiment.

Turning now to FIG. 11, an illustration of a base plate attached to housing 302 is depicted in accordance with an advantageous embodiment. In this illustrative example, base plate 1100 may be attached to bottom 1101 of housing 302. In some illustrative examples, base plate 1100 may form a part of housing 302. For example, without limitation, surface 1103 of base plate 1100 may form wall 306 for housing 302.

In this depicted example, base plate 1100 may be attached to housing 302 using screws 1102, 1104, 1106, and 1108. In particular, screws 1102, 1104, 1106, and 1108 may be inserted into base plate 1100 through bottom 1109 of base plate 1100 and into channels 336, 338, 340, and 342, respectively, in housing 302. In this manner, these screws may secure base plate 1100 to housing 302.

When base plate 1100 is secured to housing 302, surface 1103 of base plate 1100 and opening 352 in housing 302 may form slot 1112. Slot 1112 may be configured to receive extremely low frequency sensor 248 in FIG. 2.

Figure 12:
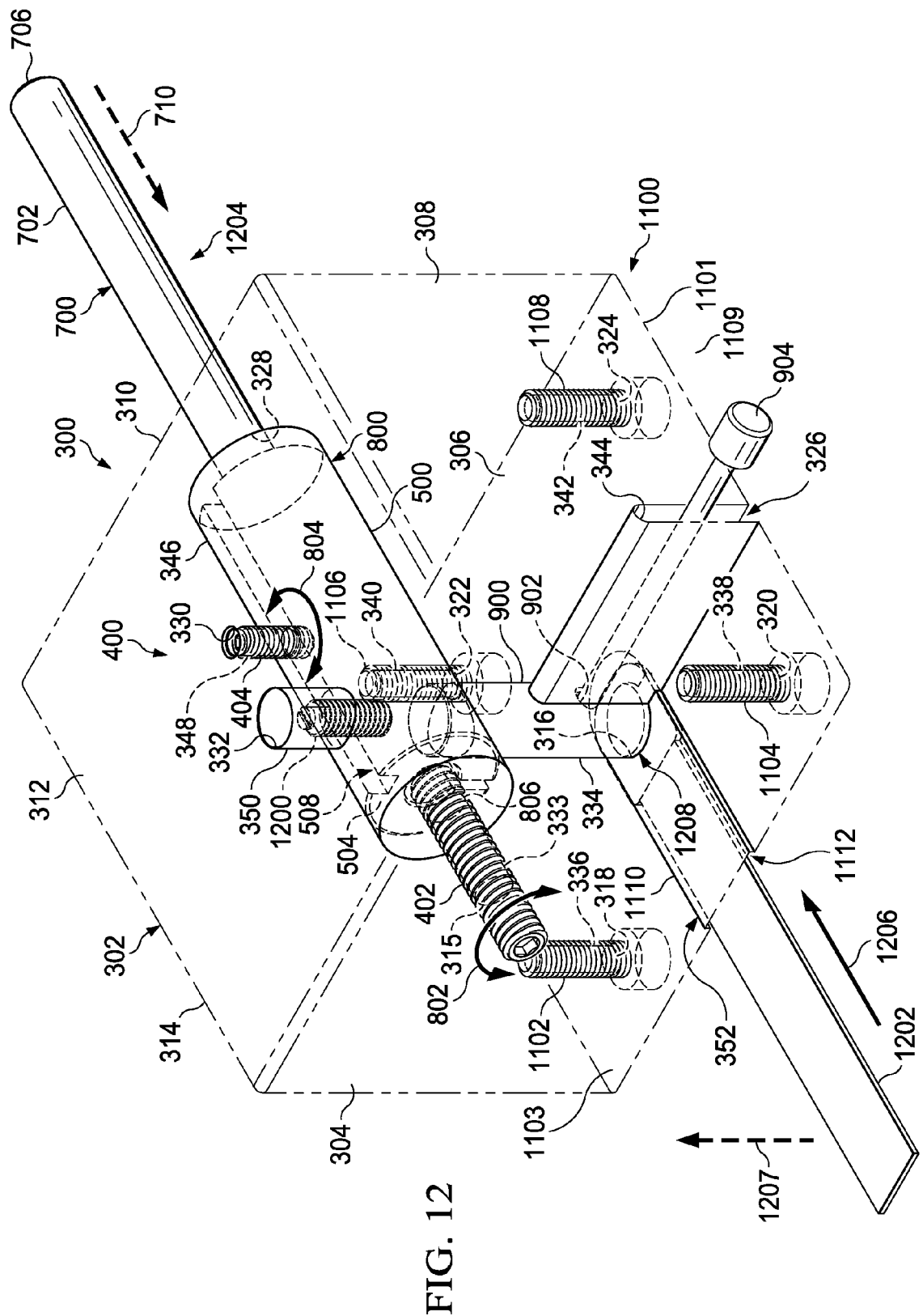
FIG. 12 is an illustration of a final setup for a calibration system in accordance with an advantageous embodiment.

With reference now to FIG. 12, an illustration of a final setup for calibration system 300 is depicted in accordance with an advantageous embodiment. In this illustrative example, calibration system 300 may be in a fully-assembled form and may be used to calibrate deburring tool 700.

As depicted, in the final setup for calibration system 300, screw 1200 and sensor 1202 may be positioned within housing 302. In particular, screw 1200 may be inserted into channel 350 through opening 332 of housing 302. Screw 1200 may be part of positioning system 400. In these illustrative examples, screw 1200 may take the form of a ball plunger screw.

When placed into channel 350, screw 1200 may be configured to pass through opening 512 in FIG. 5 in groove 508 of adapter 500. Screw 1200 may hold deburring tool 700 in desired position 1204 such that deburring tool 700 does not move and/or rotate more than desired within tool channel 506 from FIG. 5 of adapter 500. Further, screw 1200 may hold deburring tool 700 in desired position 1204 such that moveable blade 708 in FIG. 7 on deburring tool 700 may face opening 316 and channel 334.

Sensor 1202 may be inserted into slot 1112 in the direction of arrow 1206. In particular, bolt 904 may be used to lift force transfer member 900 off of wall 306 of housing 302 in the direction of arrow 1207 such that portion 1208 of sensor 1202 may be positioned underneath force transfer member 900. When portion 1208 of sensor 1202 is positioned underneath force transfer member 900, force transfer member 900 may be lowered back onto sensor 1202.

Force transfer member 900 may function as an interface between moveable blade 708 in FIG. 7 and sensor 1202. In particular, force transfer member 900 may be configured to transfer a force being applied to moveable blade 708 in FIG. 7 by biasing mechanism 712 in FIG. 7 to sensor 1202.

Turning now to FIGS. 13-16, illustrations of calibration system 300 in a fully-assembled form are depicted in accordance with an advantageous embodiment. In these figures, housing 302 may not be depicted in phantom view, as compared to housing 302 in FIGS. 3-12.

Figure 13:
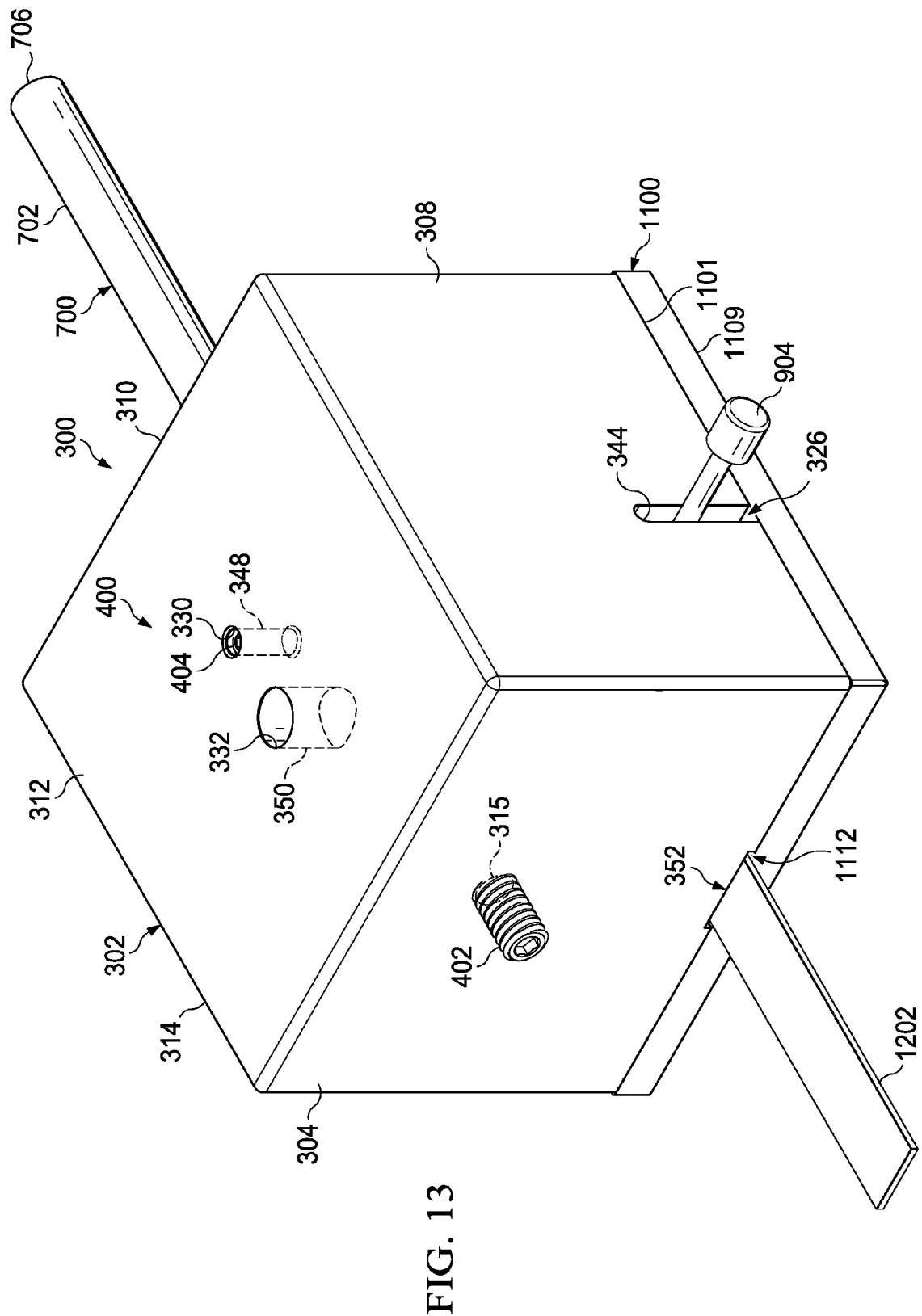
FIG. 13 is a top perspective view of a calibration system in accordance with an advantageous embodiment.
Figure 14:
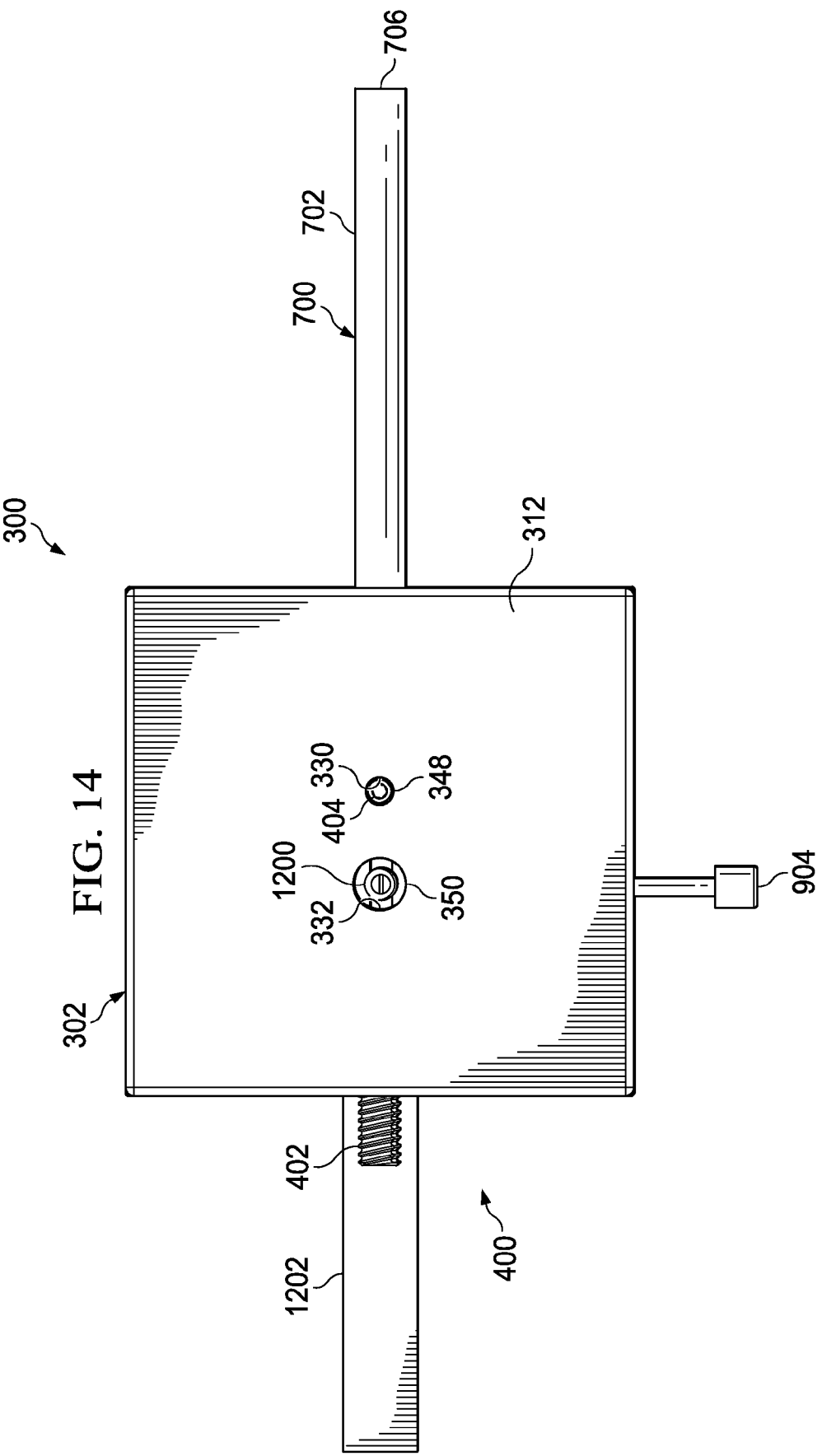
FIG. 14 is a top view of a calibration system in accordance with an advantageous embodiment.
Figure 15:
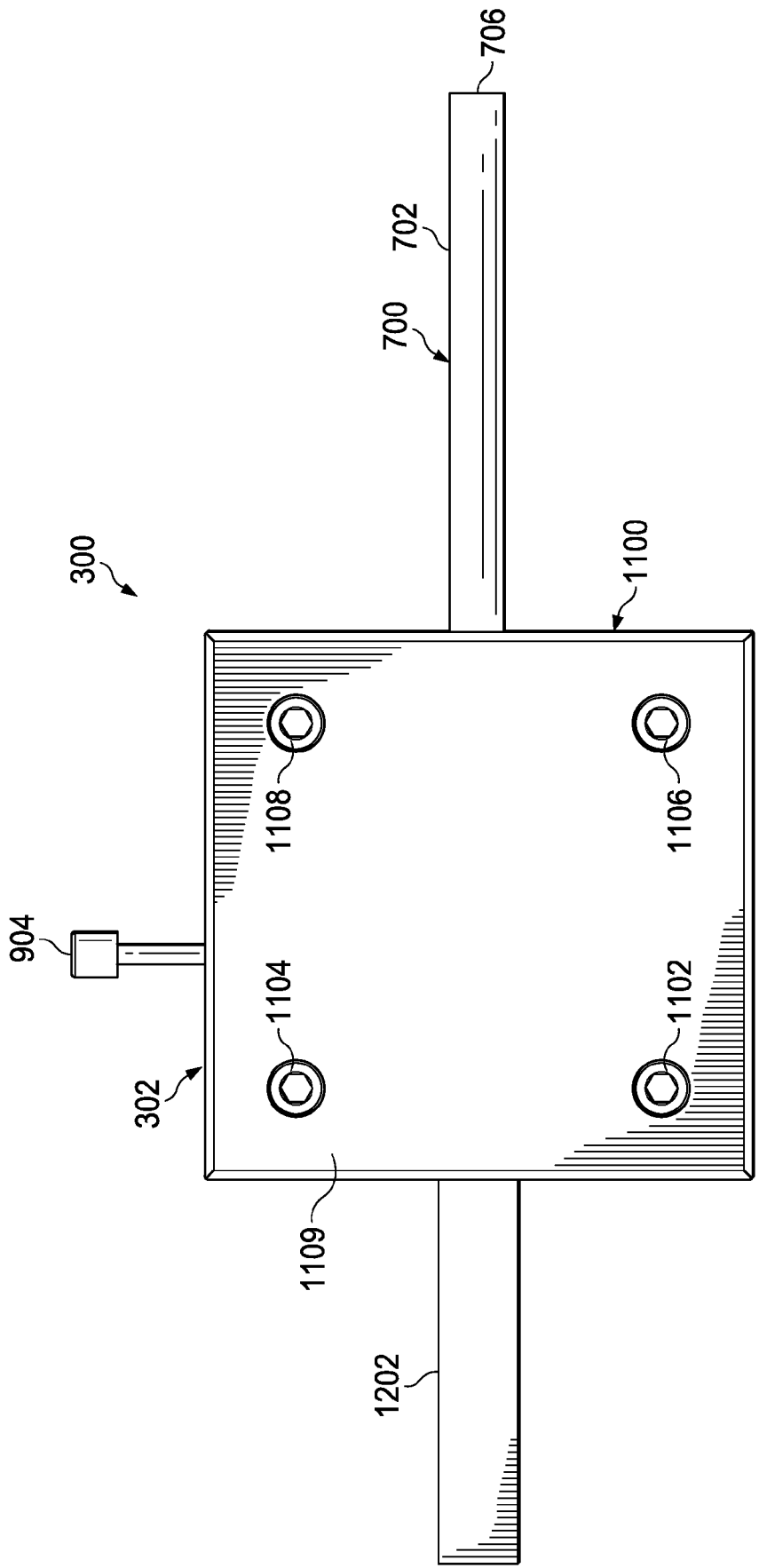
FIG. 15 is an illustration of a bottom view of a calibration system in accordance with an advantageous embodiment.
Figure 16:
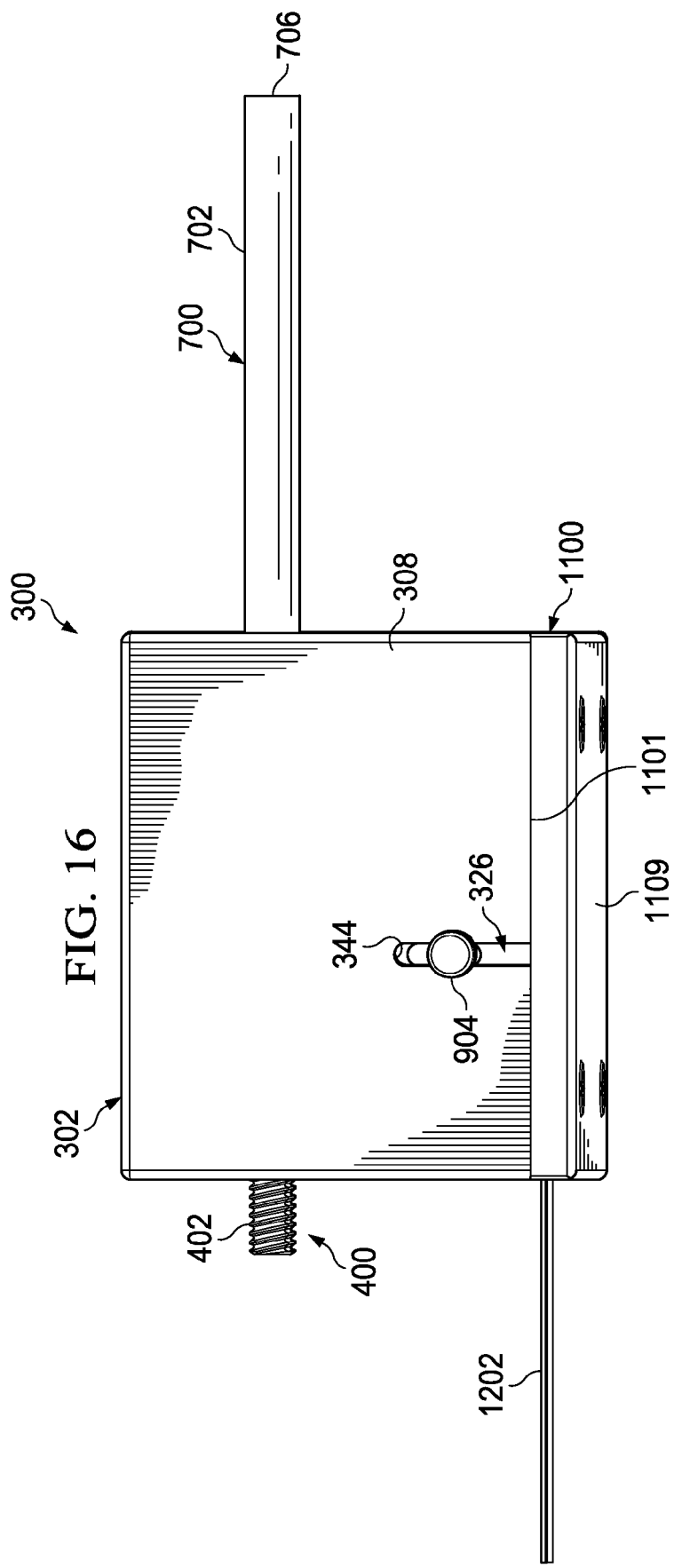
FIG. 16 is an illustration of a side view of a calibration system in accordance with an advantageous embodiment.

In FIG. 13, a top perspective view of calibration system 300 is depicted. In FIG. 14, a top view of calibration system 300 is depicted. Further, in FIG. 15, a bottom view of calibration system 300 is depicted. In FIG. 16, a side view of calibration system 300 is depicted.

Figure 17:
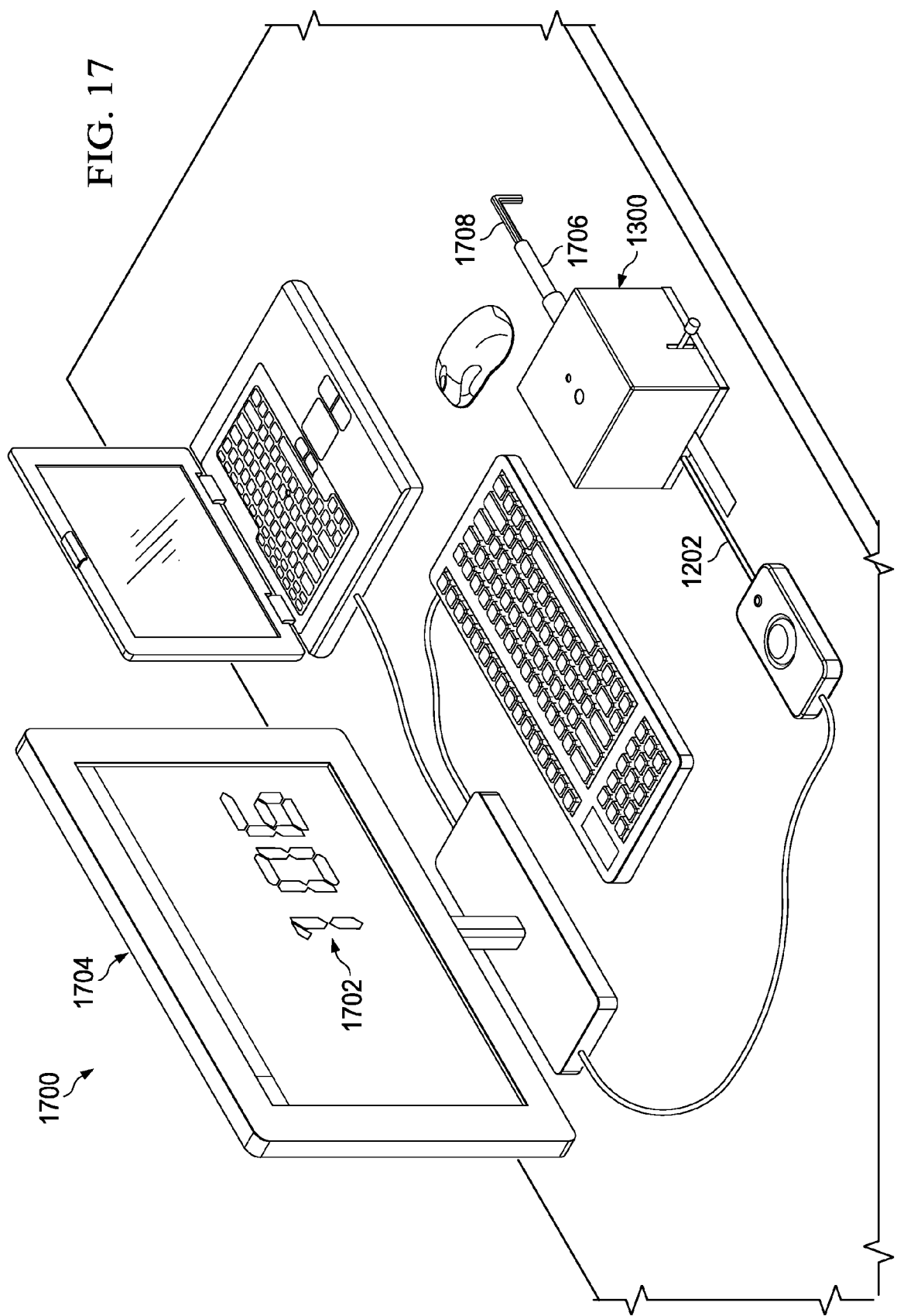
FIG. 17 is an illustration of a calibration system being used to calibrate a deburring tool in accordance with an advantageous embodiment.

With reference now to FIG. 17, an illustration of calibration system 300 in FIG. 3 during use in calibrating deburring tool 700 in FIG. 7 is depicted in accordance with an advantageous embodiment. As depicted in this example, calibration system 300 may include computer system 1700. Sensor 1202 may be in communication with computer system 1700.

Computer system 1700 may be an example of one implementation for computer system 234 in FIG. 2. As depicted, sensor 1202 may be configured to detect a force that may be applied to moveable blade 708 from FIG. 7 by biasing mechanism 712 from FIG. 7. In response to detecting this force, sensor 1202 may send an electrical signal to computer system 1700.

Computer system 1700 may be configured to identify force information 1702 using the electrical signal received from sensor 1202 to display force information 1702 on display system 1704. In this illustrative example, force information 1702 is a magnitude of the force detected at sensor 1202.

An operator may use force information 1702 to determine whether the force being applied to moveable blade 708 in FIG. 7 by biasing mechanism 712 in FIG. 7 is substantially equal to a desired force within selected tolerances. If the force being applied by biasing mechanism 712 is not substantially equal to the desired force within selected tolerances, the operator may use adjustment tool 1706 to adjust the force applied by biasing mechanism 712.

In this illustrative example, adjustment tool 1706 may take the form of Allen wrench 1708. Adjustment tool 1706 may be used to extend or compress a length of a spring in biasing mechanism 712 to change the amount of force exerted by the spring on moveable blade 708.

Figure 18:
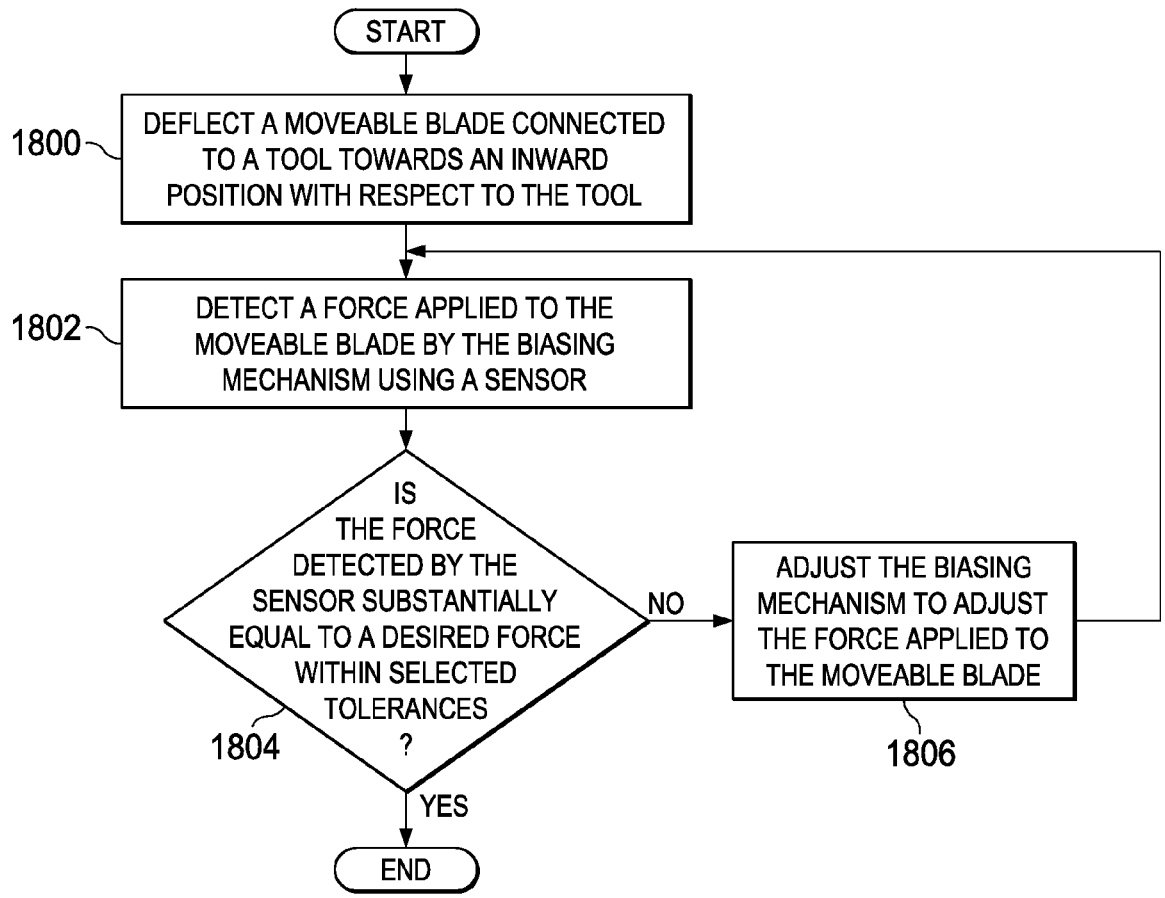
FIG. 18 is an illustration of a flowchart of a process for calibrating a tool in accordance with an advantageous embodiment.

With reference now to FIG. 18, an illustration of a flowchart of a process for calibrating a tool is depicted in accordance with an advantageous embodiment. The process illustrated in FIG. 18 may be performed using calibration system 200 in FIG. 2. In particular, this process may be performed using calibration system 200 in FIG. 2 to calibrate tool 202 in FIG. 2.

The process may begin by deflecting moveable blade 210 connected to tool 202 towards inward position 250 with respect to tool 202 (operation 1800). In operation 1800, moveable blade 210 may be deflected towards inward position 250 by applying a force to moveable blade 210 that is substantially opposite to and greater than force 216 being applied to moveable blade 210 by biasing mechanism 208.

Force 216 applied to moveable blade 210 by biasing mechanism 208 may be generated by spring 220 in biasing mechanism 208. In particular, extension or compression of spring 220 may cause spring 220 to exert force 216.

In this illustrative example, tool 202 may be positioned within adapter 240 for calibration system 200 in FIG. 2. Operation 1800 may be performed using force transfer member 232. In particular, force transfer member 232 and adapter 240 with tool 202 may be positioned within housing 224 for calibration system 200 such that force transfer member 232 may move moveable blade 210 from extended position 217 to inward position 250.

Thereafter, force 216 applied to moveable blade 210 by biasing mechanism 208 may be detected using sensor 230 (operation 1802). In particular, force 216 applied to moveable blade 210 by biasing mechanism 208 may be transferred to sensor 230 using force transfer member 232.

Next, a determination may be made as to whether force 216 detected by sensor 230 is substantially equal to desired force 222 within selected tolerances (operation 1804). If force 216 is substantially equal to desired force 222 within selected tolerances, the process terminates. Otherwise, biasing mechanism 208 may be adjusted to adjust force 216 applied to moveable blade 210 (operation 1806). The process then returns to operation 1802 as described above.

In operation 1806, force 216 may be adjusted using adjustment tool 235. In particular, adjustment tool 235 may be used to manipulate adjustment screw 218 in biasing mechanism 208 to adjust force 216 exerted by spring 220.

Figure 19:
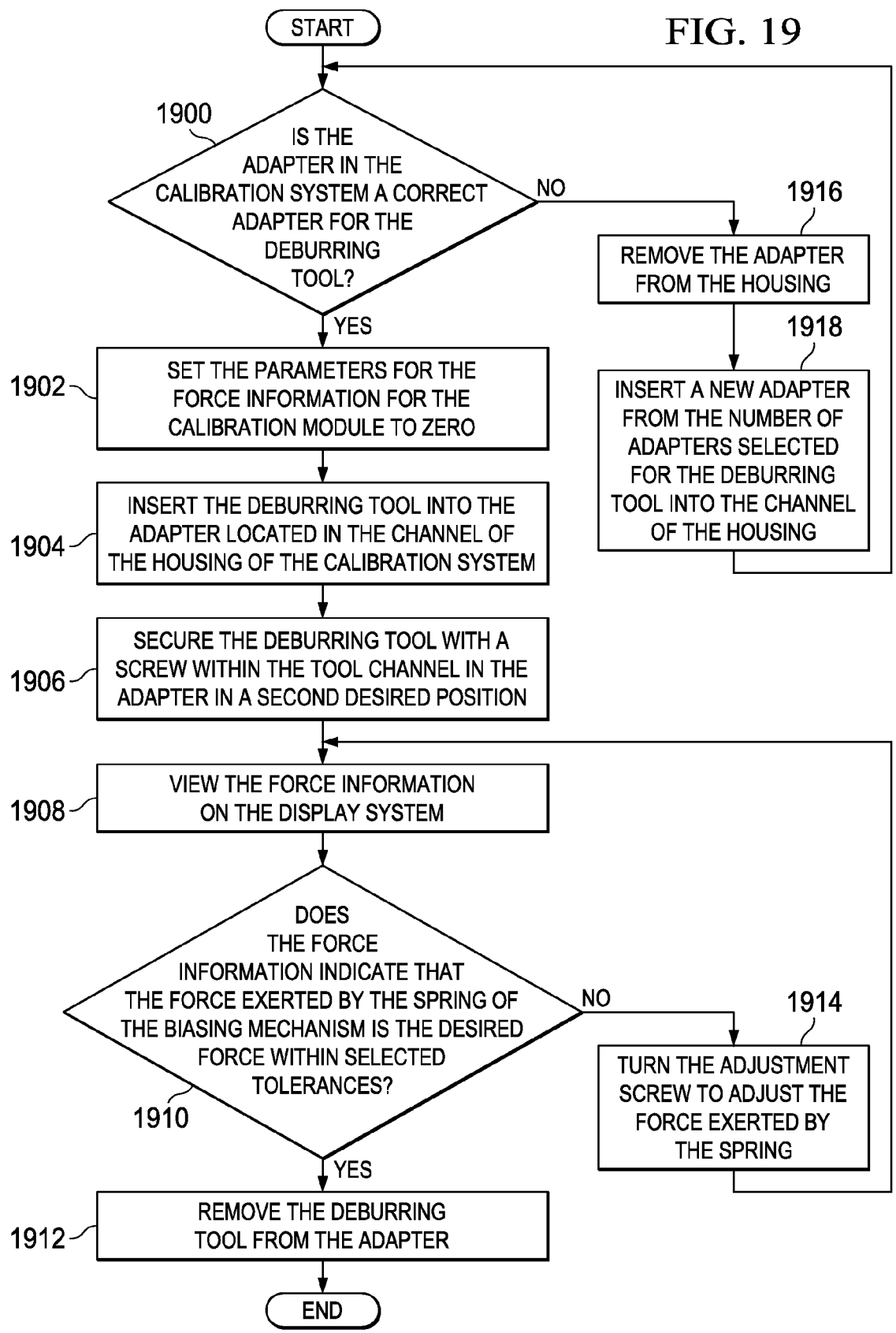
FIG. 19 is an illustration of a flowchart of a process for calibrating a tool in accordance with an advantageous embodiment.

With reference now to FIG. 19, an illustration of a flowchart of a process for calibrating a tool is depicted in accordance with an advantageous embodiment. The process illustrated in FIG. 19 may be implemented using calibration system 200 in FIG. 2 to calibrate deburring tool 204 in FIG. 2.

The process may begin by determining whether adapter 240 in calibration system 200 is a correct adapter for deburring tool 204 (operation 1900). Prior to operation 1900, an assumption may be made that calibration system 200 has been fully and correctly assembled. For example, the assumption may be made that calibration system 200 has been assembled in a manner similar to the fully-assembled form of calibration system 300 in FIG. 12, excluding deburring tool 700. Further, the assumption also may be made that sensor 230 has been inserted into housing 224 of calibration system 300 and has been connected to calibration module 254.

In operation 1900, the determination may be made based on a size of adapter 240 and/or a size of tool channel 241 in adapter 240. If adapter 240 is the correct adapter for deburring tool 204, parameters for force information 256 for calibration module 254 may be set to zero (operation 1902).

Thereafter, deburring tool 204 may be inserted into adapter 240 located in channel 245 of housing 224 of calibration system 200 (operation 1904). Then, a screw, such as screw 1200 in FIG. 12, may be used to secure deburring tool 204 within tool channel 241 in adapter 240 in second desired position 247 (operation 1906). In this illustrative example, screw 1200 may be a ball plunger screw.

Next, an operator may view force information 256 on display system 258 (operation 1908). The operator may determine whether force information 256 indicates that force 216 exerted by spring 220 of biasing mechanism 208 is desired force 222 within selected tolerances (operation 1910).

If a determination is made that force 216 exerted by spring 220 of biasing mechanism 208 is desired force 222 within selected tolerances, deburring tool 204 may be removed from adapter 240 (operation 1912), with the process terminating thereafter. Deburring tool 204 may now be ready for use.

However, with reference again to operation 1910, if a determination is made that force 216 exerted by spring 220 of biasing mechanism 208 is not desired force 222 within selected tolerances, the operator may turn adjustment screw 218 to adjust force 216 exerted by spring 220 (operation 1914), with the process then returning to operation 1908.

With reference again to operation 1900, if adapter 240 is not the correct adapter for deburring tool 204, the operator may remove adapter 240 from housing 224 (operation 1916). Then, the operator may insert a new adapter from number of adapters 226 selected for deburring tool 204 into channel 245 of housing 224 (operation 1918). The process may then return to operation 1900 as described above.

Figure 20:
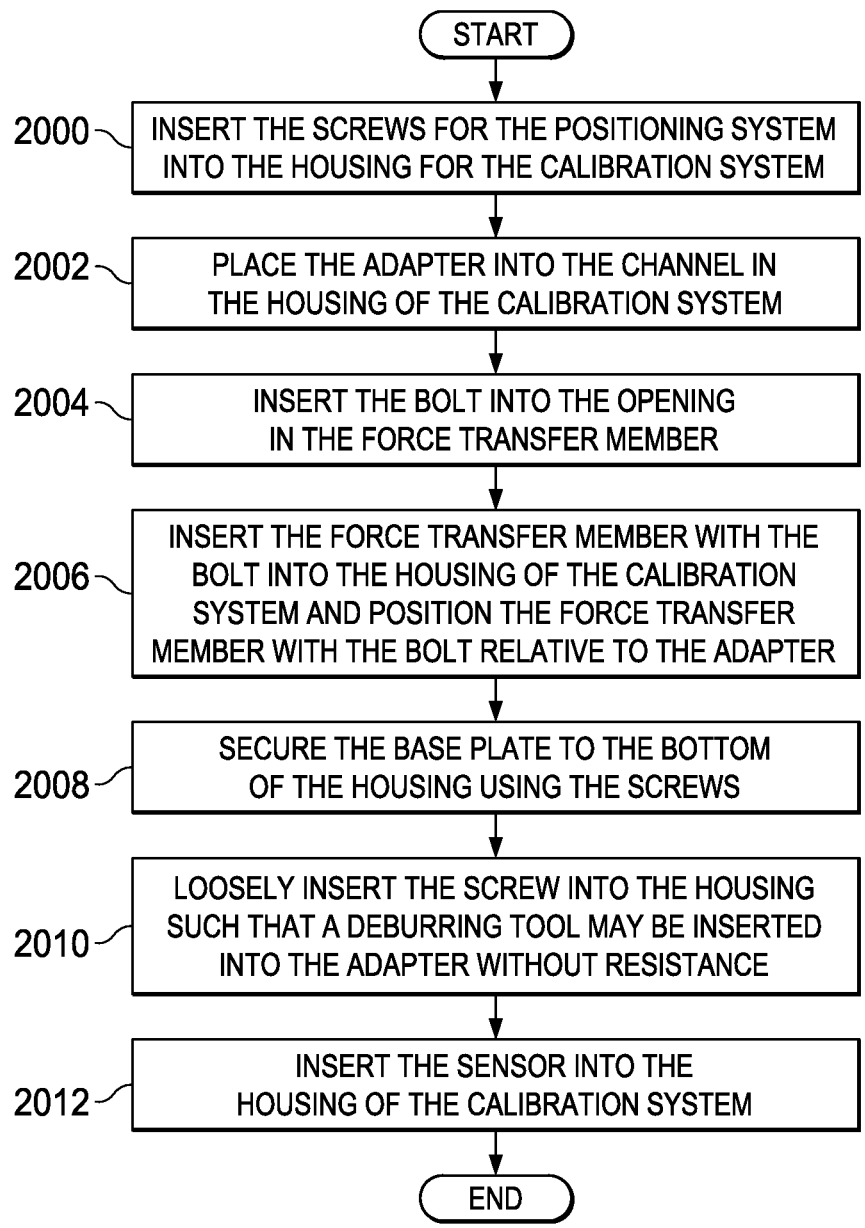
FIG. 20 is an illustration of a flowchart of a process for setting up a calibration system in accordance with an advantageous embodiment.

With reference now to FIG. 20, an illustration of a flowchart of a process for setting up a calibration system is depicted in accordance with an advantageous embodiment. The process illustrated in FIG. 20 may be implemented to set up calibration system 200 in FIG. 2. In particular, this process may be implemented to set up calibration system 200 in the form of calibration system 300 in FIGS. 3-12.

The process may begin by inserting screw 402 and screw 404 for positioning system 400 into housing 302 for calibration system 300 (operation 2000). Next, adapter 500 from FIGS. 5 and 6 may be placed into channel 346 in housing 302 of calibration system 300 (operation 2002). Screw 402 and screw 404 may be used to hold adapter 500 within channel 346 such that adapter 500 does not rotate and/or slide within channel 346. In particular, screw 402 and screw 404 may be configured to hold adapter 500 in a desired position, such as first desired position 246 in FIG. 2.

Next, bolt 904 may be inserted into opening 902 in force transfer member 900 (operation 2004). Bolt 904 may be part of positioning system 400. Force transfer member 900 with bolt 904 may then be inserted into housing 302 of calibration system 300 and positioned relative to adapter 500 (operation 2006). In particular, in operation 2006, force transfer member 900 may be positioned such that a moveable blade on a deburring tool, such as moveable blade 708 on deburring tool 700 in FIG. 7, may be retracted into deburring tool 700 when deburring tool 700 is placed inside adapter 500 and moveable blade 708 comes in contact with force transfer member 900.

Thereafter, base plate 1100 may be secured to bottom 1101 of housing 302 using screws 1102, 1104, 1106, and 1108 (operation 2008). Once operation 2008 is performed, slot 1112 may be formed between surface 1103 of base plate 1100 and wall 304 of housing 302.

Next, screw 1200 may be loosely inserted into housing 302 such that a deburring tool, such as deburring tool 700 in FIG. 7, may be inserted into adapter 500 without resistance (operation 2010). Thereafter, sensor 1202 may be inserted into housing 302 of calibration system 300 (operation 2012), with the process terminating thereafter. After operation 2012, calibration system 300 may be fully assembled and ready for use. For example, without limitation, calibration system 300 assembled using the process illustrated in FIG. 20 may be used for calibrating a deburring tool according to the process described in FIG. 19.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 21, an illustration of a data processing system is depicted in accordance with an advantageous embodiment. In this illustrative example, data processing system 2100 may be used to implement one or more of computer system 234 in FIG. 2. Data processing system 2100 includes communications fabric 2102, which provides communications between processor unit 2104, memory 2106, persistent storage 2108, communications unit 2110, input/output (I/O) unit 2112, and display 2114.

Processor unit 2104 serves to execute instructions for software that may be loaded into memory 2106. Processor unit 2104 may be a number of processors, a multi-processor core, or some other type of processor, depending on the particular implementation. A number, as used herein with reference to an item, means one or more items. Further, processor unit 2104 may be implemented using a number of heterogeneous processor systems in which a main processor is present with secondary processors on a single chip. As another illustrative example, processor unit 2104 may be a symmetric multi-processor system containing multiple processors of the same type.

Memory 2106 and persistent storage 2108 may be examples of storage devices 2116. A storage device may be any piece of hardware that is capable of storing information, such as, for example, without limitation, data, program code in functional form, and/or other suitable information either on a temporary basis and/or a permanent basis. Storage devices 2116 may also be referred to as computer readable storage devices in these examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these examples, provides for communications with other data processing systems or devices. In these examples, communications unit 2110 is a network interface card. Communications unit 2110 may provide communications through the use of either or both physical and wireless communications links.

Input/output unit 2112 may allow for input and output of data with other devices that may be connected to data processing system 2100. For example, input/output unit 2112 may provide a connection for user input through a keyboard, a mouse, and/or some other suitable input device. Further, input/output unit 2112 may send output to a printer. Display 2114 may provide a mechanism to display information to a user.

Instructions for the operating system, applications, and/or programs may be located in storage devices 2116, which are in communication with processor unit 2104 through communications fabric 2102. In these illustrative examples, the instructions may be in a functional form on persistent storage 2108. These instructions may be loaded into memory 2106 for execution by processor unit 2104. The processes of the different embodiments may be performed by processor unit 2104 using computer-implemented instructions, which may be located in a memory, such as memory 2106.

These instructions may be referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 may be located in a functional form on computer readable media 2120 that is selectively removable and may be loaded onto or transferred to data processing system 2100 for execution by processor unit 2104. Program code 2118 and computer readable media 2120 may form computer program product 2122 in these examples. In one example, computer readable media 2120 may be computer readable storage media 2124 or computer readable signal media 2126. Computer readable storage media 2124 may include, for example, without limitation, an optical or magnetic disk that may be inserted or placed into a drive or other device that is part of persistent storage 2108 for transfer onto a storage device, such as a hard drive, that is part of persistent storage 2108.

Computer readable storage media 2124 also may take the form of a persistent storage, such as a hard drive, a thumb drive, or a flash memory, that is connected to data processing system 2100. In some instances, computer readable storage media 2124 may not be removable from data processing system 2100. In these examples, computer readable storage media 2124 may be a physical or tangible storage device used to store program code 2118 rather than a medium that propagates or transmits program code 2118. Computer readable storage media 2124 also may be referred to as a computer readable tangible storage device or a computer readable physical storage device. In other words, computer readable storage media 2124 may be a media that can be touched by a person.

Alternatively, program code 2118 may be transferred to data processing system 2100 using computer readable signal media 2126. Computer readable signal media 2126 may be, for example, without limitation, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 2118 may be downloaded over a network to persistent storage 2108 from another device or data processing system through computer readable signal media 2126 for use within data processing system 2100. For instance, program code stored in a computer readable storage medium in a server data processing system may be downloaded over a network from the server to data processing system 2100. The data processing system providing program code 2118 may be a server computer, a client computer, or some other device capable of storing and transmitting program code 2118.

The different components illustrated for data processing system 2100 are not meant to provide architectural limitations to the manner in which different embodiments may be implemented. The different advantageous embodiments may be implemented in a data processing system including components in addition to or in place of those illustrated for data processing system 2100. Other components shown in FIG. 21 may be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2104 may take the form of a hardware unit that has circuits that are manufactured or configured for a particular use. This type of hardware may perform operations without needing program code to be loaded into a memory from a storage device to be configured to perform the operations.

For example, when processor unit 2104 takes the form of a hardware unit, processor unit 2104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices may include, for example, without limitation, a programmable logic array, a field programmable logic array, a field programmable gate array, and other suitable hardware devices. With this type of implementation, program code 2118 may be omitted, because the processes for the different embodiments are implemented in a hardware unit.

In still another illustrative example, processor unit 2104 may be implemented using a combination of processors found in computers and hardware units. Processor unit 2104 may have a number of hardware units and a number of processors that are configured to run program code 2118. With this depicted example, some of the processes may be implemented in the number of hardware units, while other processes may be implemented in the number of processors.

In another example, a bus system may be used to implement communications fabric 2102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, without limitation, a modem or a network adapter, two network adapters, or some combination thereof. Further, a memory may be, for example, memory 2106, or a cache, such as found in an interface and memory controller hub that may be present in communications fabric 2102.

Thus, the different advantageous embodiments provide a method and apparatus for calibrating a tool, such as deburring tool 100 in FIG. 1. In one advantageous embodiment, a method for calibrating the tool may be provided. A moveable blade connected to the tool may be moved towards an inward position with respect to the tool. A force applied to a sensor in response to movement of the moveable blade connected to the tool towards the inward position may be detected. A biasing mechanism in the tool may be adjusted if the force is not a desired force. In particular, a force applied to the moveable blade by the biasing mechanism in the tool may be adjusted.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for calibrating a tool, the method comprising:
deflecting a moveable blade connected to the tool towards an inward position with respect to the tool;
detecting a force applied to the moveable blade by a biasing mechanism in the tool using a sensor when the moveable blade is in the inward position with respect to the tool; and
adjusting the biasing mechanism in the tool if the force is not a desired force, wherein the desired force is a selected force for reducing an inconsistency generated in response to forming a hole.

2. The method of claim 1 further comprising:
placing the tool with the moveable blade into a housing, wherein the sensor is configured to detect the force applied to the moveable blade by the biasing mechanism.

3. The method of claim 2, wherein placing the tool with the moveable blade into the housing, wherein the sensor is configured to detect the force applied to the moveable blade by the biasing mechanism comprises:
placing the tool with the moveable blade into an adapter configured to receive the tool; and placing the adapter into the housing, wherein the sensor is configured to detect the force applied to the moveable blade by the biasing mechanism.

4. The method of claim 1, wherein deflecting the moveable blade connected to the tool towards the inward position with respect to the tool comprises:
positioning a force transfer member within a housing relative to the tool, wherein a position of the force transfer member within the housing is configured to cause the moveable blade to move towards the inward position.

5. The method of claim 1, wherein adjusting the biasing mechanism in the tool if the force is not the desired force comprises:
adjusting the biasing mechanism in the tool if the force is not the desired force until the force detected by the sensor is the desired force.

6. The method of claim 1, wherein the desired force is a selected force for removing an inconsistency from forming a hole such that a chamfer formed by the tool has a number of dimensions within selected tolerances.

7. The method of claim 1, wherein the tool is a deburring tool configured to remove an inconsistency generated in response to forming a hole.

8. A method for calibrating a deburring tool, the method comprising:
placing the deburring tool with a moveable blade connected to the deburring tool into an adapter configured to receive the deburring tool;
placing the adapter with the deburring tool into a housing;
positioning a force transfer member within the housing relative to the deburring tool and the adapter, in which a position of the force transfer member is configured to cause the moveable blade to move towards an inward position and in which the force transfer member is configured to transfer a force applied to the moveable blade by a biasing mechanism in the deburring tool to a sensor;
detecting the force applied to the moveable blade by the biasing mechanism using the sensor, wherein the force is exerted by a spring in the biasing mechanism; and
adjusting the biasing mechanism using an adjustment tool and an adjustment screw in the biasing mechanism to perform at least one of extending and compressing the spring in the biasing mechanism to adjust the force applied to the moveable blade if the force detected by the sensor is not a desired force selected for reducing an inconsistency generated in response to forming a hole.

9. An apparatus comprising:
a housing configured to receive a tool with a moveable blade that can be moved into the tool to an inward position;
an adapter configured to receive the tool and wherein the adapter is configured to be placed into a channel in the housing;
a positioning system configured to hold the adapter in a desired position for detecting a force applied to the moveable blade by a biasing mechanism; and
a sensor associated with the housing in which the sensor is configured to detect the force when the moveable blade is in the inward position.

10. The apparatus of claim 9, wherein the tool is a cutting tool and further comprising:
an adjustment tool configured to change the force applied to the moveable blade by the biasing mechanism.

11. The apparatus of claim 10, wherein the biasing mechanism in the tool is configured to bias the moveable blade away from the inward position to generate the force.

12. The apparatus of claim 9 further comprising:
a force transfer member configured to transfer the force applied to the moveable blade by the biasing mechanism to the sensor.

13. The apparatus of claim 9, wherein the channel is a first channel; a force transfer member is configured to be placed into a second channel in the housing in which the second channel is in communication with the first channel; a first end of the force transfer member is configured to contact the moveable blade in the adapter; and a second end of the force transfer member is configured to contact the sensor such that the force generated by the moveable blade in the inward position in response to the force being applied to the moveable blade by the biasing mechanism is applied to the sensor via the force transfer member.

14. The apparatus of claim 9 further comprising:
a data processing system in communication with the sensor, wherein the data processing system is configured to determine whether the force detected by the sensor is a desired force.

15. The apparatus of claim 14, wherein the desired force is a selected force for removing an inconsistency from forming a hole such that a chamfer formed by the tool has a number of dimensions within selected tolerances.

16. The apparatus of claim 9, wherein the tool is a deburring tool configured to remove an inconsistency generated in response to forming a hole.

17. A calibration system comprising:
a housing configured to receive a deburring tool with a moveable blade that can be moved into the deburring tool to an inward position in which the deburring tool is configured to remove an inconsistency generated in response to forming a hole;
a sensor associated with the housing in which the sensor is configured to detect a force applied to the moveable blade by a biasing mechanism in the deburring tool when the moveable blade is in the inward position in which the biasing mechanism in the deburring tool is configured to bias the moveable blade away from the inward position to generate the force;
an adjustment tool configured to change the force applied to the moveable blade by the biasing mechanism;
an adapter configured to receive the deburring tool in which the adapter is configured to be placed into a channel in the housing;
a force transfer member configured to transfer the force applied to the moveable blade by the biasing mechanism to the sensor;
a positioning system configured to hold the adapter in a desired position for detecting the force applied to the moveable blade by the biasing mechanism; and
a data processing system in communication with the sensor in which the data processing system is configured to determine whether the force detected by the sensor is a desired force.

* * * * *